United States Patent [19]
Gleasman et al.

[11] Patent Number: 5,513,553
[45] Date of Patent: May 7, 1996

[54] HYDRAULIC MACHINE WITH GEAR-MOUNTED SWASH-PLATE

[76] Inventors: Vernon E. Gleasman, 11 Pondview Dr., Pittsford, N.Y. 14534; Keith E. Gleasman, 11 McCoord Woods, Fairport, N.Y. 14450

[21] Appl. No.: 274,220

[22] Filed: Jul. 13, 1994

[51] Int. Cl.⁶ ........................................ F01B 3/00
[52] U.S. Cl. ................................ 92/12.2; 92/71; 74/839; 74/60
[58] Field of Search .................... 92/12.2, 71; 74/60, 74/839; 417/222.1

[56] References Cited

U.S. PATENT DOCUMENTS

| | | | |
|---|---|---|---|
| 2,258,127 | 10/1941 | Almen . | |
| 2,513,758 | 7/1950 | Talbot | 92/12.2 |
| 2,737,895 | 3/1956 | Ferris | 91/506 |
| 2,737,900 | 3/1956 | Smith | 417/222.1 |
| 3,712,759 | 1/1973 | Olson, Jr. . | |
| 3,996,806 | 12/1976 | Alexander | 74/60 |
| 4,042,309 | 8/1977 | Hiraga . | |
| 4,433,596 | 2/1984 | Scalzo . | |
| 4,624,175 | 11/1986 | Wahlmark . | |
| 5,054,289 | 10/1991 | Nagatomo . | |

*Primary Examiner*—F. Daniel Lopez
*Attorney, Agent, or Firm*—Eugene Stephens & Associates

[57] ABSTRACT

The disclosure is directed primarily to pairs of unique nutating gears which are used for restraining the rotation of the wobbler portion of the split swash-plates of both variable- and fixed-displacement hydraulic machines in which the pistons reciprocate in fixed cylinders. Each pair consists of an internal gear fixed to the housing and an external gear fixed to the outer circumferential surface of the wobbler. Using any one of four different tooth designs, the gears simultaneously share two centers of meshing engagement when nutating, and they do not interfere with the complex lemniscate motion of the wobbler. This wobbler mounting arrangement results in significant size and weight reductions which are further enhanced by sliding shoe bearing assemblies that carry the axial loads developed by the machine's reciprocating pistons. The hydraulic machine is also provided with a modular design that makes it possible to make significant changes in displacement size with minimal changes in machine structure.

27 Claims, 14 Drawing Sheets

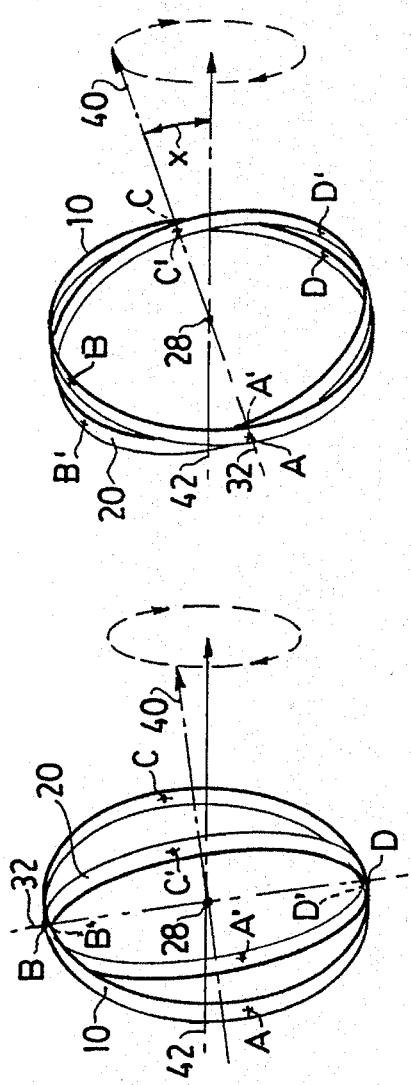
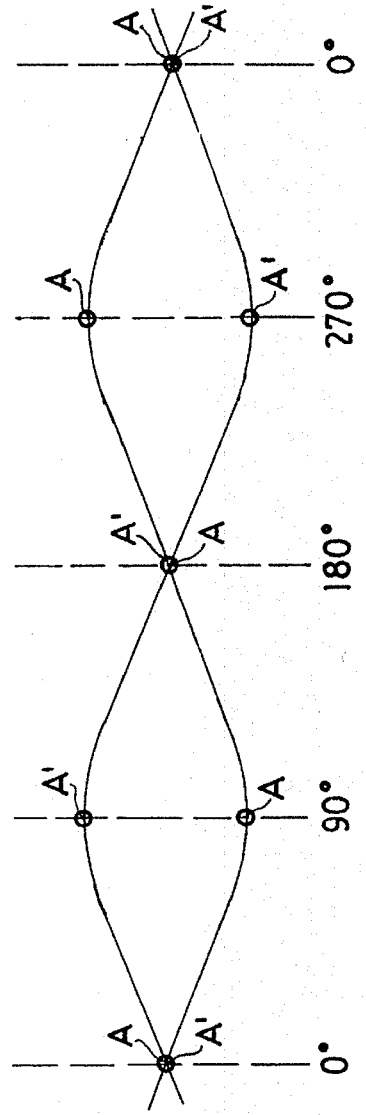

HYDRAULIC MACHINE WITH GEAR-MOUNTED SWASH-PLATE

TECHNICAL FIELD

The invention relates to hydraulic pump/motor machines of the type used in automotive, aerospace, machine tool, and manufacturing industries and to structures for mounting swash-plates in such machines.

BACKGROUND OF INVENTION

Our earlier application U.S. Ser. No. 936,842 (filed 27 Aug. 1992 and entitled "Variable Hydraulic Machine") includes an extensive "Background" discussion relating to well-known hydraulic pumps and motors, and it discloses several embodiments of fixed- and variable-displacement hydraulic machines which comprise the invention disclosed therein (hereinafter referred to as "our earlier pump/motor invention"). The disclosure of above-identified application Ser. No. 936,842 is pertinent to our invention and, therefore, is fully incorporated herein by reference.

A large percentage of commercially-acceptable hydraulic pump/motors utilize rotating cylinder blocks having reciprocating pistons that ride over an angularly-positioned swash-plate. It has long been known that it is usually more efficient to use fixed cylinders and pistons to cause rotation of a split swash-plate. However, most known designs for mounting of such split swash-plates have proven to be so complex and expensive to manufacture and maintain that split swash-plate designs have not achieved wide commercial acceptance when both relatively high pressures and relatively high speeds are required (e.g., for automotive drives).

Our earlier pump/motor invention, as disclosed in above-identified application Ser. No. 936,842, has cylinders formed circumferentially about the central axis of a cylindrical housing that does not rotate; and connecting rods transfer reciprocal motion between its axial pistons and a nutating swash-plate. The swash-plate is split into a "wobbler" portion, which nutates but does not rotate, and a "rotor" portion, which both nutates and rotates, the rotor portion being connected to a drive element that is aligned with the pump's central axis and supported in a main bearing positioned at one end of the housing. For fixed-displacement embodiments, the rotor portion of the split swash-plate is secured to the drive element at a fixed inclination; while, for variable-displacement embodiments, the inclination of the swash-plate is varied by the movement of its pivot which is attached to a slideable shaft positioned by a servo-mechanism.

Our earlier pump/motor invention is a unique combination of well-known mechanical elements organized and mounted in a novel manner to provide a hydraulic machine capable of operating at improved maximum speeds and pressures while, at the same time, being remarkably reduced in size and weight. Our earlier invention, which is disclosed in several embodiments, comprises an exceptionally compact reciprocating-piston pump unit capable of developing much higher horsepower than known pumps of similar physical dimensions.

While the prior art includes myriad designs incorporating fixed cylinders and split swash-plates, we are unaware of any presently-available commercial hydraulic pumps or motors using such prior art designs for automotive or industrial purposes. Apparently, these prior art designs are either incapable of satisfactory performance under the wide range of pressures and speeds necessary for automotive or industrial operation, or else they are too complex and expensive for commercially-feasible use.

Some part of this apparent lack of success appears to be related to the difficulty of providing an acceptable structure for supporting the split swash-plate so that its wobbler portion is free to follow its complex nutating motion without rotation. It is this latter problem to which the invention herein is primarily directed. In this regard, in another of our earlier applications, namely, U.S. Ser. No. 153,568 (filed 16 Nov. 1993 and entitled "Swash-Plate Mountings for Hydraulic Machines" and now abandoned), we disclosed two different embodiments of swash-plate mounting structures that addressed this problem. That latter application (hereinafter referred to as "our earlier swash-plate mounting invention") also includes a pertinent "Background" discussion relating to this swash-plate mounting problem as well as a bevel-gear mounting assembly for fixed-angle swash-plates and, therefore, it is also fully incorporated herein by reference.

More than fifty years ago, the problems related to providing satisfactory support for the wobbler portion (i.e., the nutating-but-not-rotating portion) of a split swash-plate were thoroughly discussed in U.S. Pat. No. 2,258,127, issued to J. O. Almen in 1941. The key problems relate to supporting a wobbler without unduly affecting its complex motion in which, as it nutates without rotation, every point on its surface follows the pattern of a lemniscate (a figure-eight pattern formed on the surface of a sphere).

The Almen reference discloses a support structure for a fixed-angle swash-plate that it describes as a "uniform velocity universal joint" which is mounted on rolling balls. About a decade ago, this same rolling-ball structure was adapted for a variable-displacement hydraulic machine in U.S. Pat. No. 4,433,596 (issued to J. Scalzo). The structures disclosed in the Almen and Scalzo references are relatively complex and require large numbers of small parts; and the maximum angle to which their swash-plates can be inclined is relatively limited (e.g., to less than 15°). In contrast, with our earlier pump/motor invention and our earlier special mounting arrangements, swash-plate inclinations can be maintained at angles as large as 25°–30° under the high pressure conditions required for industrial use.

For background purposes, reference is also made to known gear mountings for swash-plates used in the non-analogous art of refrigerant gas compressors. We use the term "non-analogous" art because automotive and industrial hydraulic machines run at high speeds (e.g., 2,000 rpm) and high pressure (e.g., 6,000 psi), and persons skilled in the design of such machines do not consider low speed/low pressure refrigerant gas compressors to be part of the same art. Nonetheless, some known refrigerant compressor designs include wobblers supported by a small pair of mating bevel gears aligned by a shared ball that also serves as a bearing between the respective gears. (For instance, see U.S. Pat. No. 3,712,759 issued to Olson, Jr. and U.S. Pat. No. 4,042,309 issued to Hiraga.)

In regard to gear mounting assemblies for split swash-plates, we are aware of only one design that appears appropriate for automotive and industrial use, namely, the bevel gear invention (disclosed in our above-cited earlier swash-plate mounting application) which, in one of our prototype motors, is capable of operating smoothly when the motor is slowed to a full stop and then restarted in either direction while subjected at all times to loads as large as 415 ft. lbs.

Another reason for the lack of commercial success of prior art split swash-plate pumps (for heavy industrial and automotive applications) may relate to the size and weight of the roller-bearing structure required to support the axial thrust of the pistons against the swash-plate assembly. In some commercially-used prior art machines of the rotating cylinder block design, pressure-balanced sliding shoes have been attached to the ends of the rotating pistons to reduce the thrust at the interface between the fixed swash-plate and the pistons. However, such sliding shoes have apparently not been viewed as appropriate for fixed cylinder/split swash-plate machines.

SUMMARY OF THE INVENTION

A primary feature of the invention disclosed herein is a special application of our new gearing system that is disclosed in U.S. Ser. No. 252,743 (filed 2 Jun. 1994 and entitled "Variable-Angle Gear System").

In its broadest sense, our new gearing system provides novel forms of gearing for directly connecting two shafts in a manner capable of transmitting rotation from the driving shaft to the driven shaft while, at the same time, permitting the angle of intersection between the axes of the shafts to be varied over a wide range extending to each side of 180° (i.e., extending to each side of the position where the axes are either in parallel alignment or are coincident) to some preferred maximum angle differing from 180° (e.g., ±45°).

We have discovered that one particular organization of our new gearing system can be used to provide a remarkable improvement in the design of hydraulic machines. Namely, in the design of one arrangement of our new gearing system disclosed in U.S. Ser. No. 252,743, the pitch circles of our mating gears are of identical size and always remain, in effect, as great circles on the same pitch sphere. This arrangement can be used to transmit constant velocity between two shafts, while allowing the shafts to be articulated relative to each other in any plane. Further, as is axiomatic in spherical geometry, such great circles intersect at two points, and the pair of lunes formed on the surface of the sphere between the intersecting great circles (i.e., the pitch circles of the gears) inscribe a giant lemniscate (a figure-eight) around the surface of the sphere. The relative movement of the contact points shared between the mating gears inscribe respective lemniscates at all relative angular adjustments of the gear shafts; and, therefore, the two shafts rotate at constant velocity.

For this just-described organization of our gearing system, we use a first gear with internal teeth having a predetermined pitch circle, and then mate it with a second gear with external teeth and having a pitch circle identical to the first gear. The gears have mating teeth that are in mesh at two areas centered 180° apart; and, since their pitch circles are the same size, they rotate at a 1:1 ratio.

As applied in our hydraulic machine invention disclosed herein, a pair of our 1:1 ratio "constant velocity" gears are used to support the wobbler of the machine's swash-plate mounting assembly. However, in this special application, our unique gear pair does not transmit rotational motion between two shafts but only nutates; and the meshing gear pair not only prevents rotation of the nutating wobbler, but also allows the wobbler to freely and quietly follow its nutating lemniscate motion even at the high speeds necessary for automotive drives.

Four different gear tooth designs are disclosed for the nutating gears that we use to support the wobbler, namely: a circle/tangent ("CT") design, a circle-on-diamond ("CD") design, a "lune" design, and a combination lune/inverse curve ("L/IC") design, all of which are described in detail below. All of these designs permit the axes of the nutating gears to variably intersect throughout a continuous range of angles measuring from each side of 180° up to some preferred maximum angle; and all share a common feature: At least the central portion of each tooth surface of each mating tooth, when viewed in a pitch plane of its respective gear, is an arc of a single circle with a diameter selected so that, when the gears are nutating, their axes can intersect throughout a continuous range of angles extending from coincident alignment to some maximum preferred angle (e.g., 18°, 30°, etc.). [NOTE: A "pitch plane" of a gear is a plane perpendicular to its axial plane (a plane including its axis) and tangent to its pitch surface which, for our gears, is a pitch sphere.]

In the CT and CD designs (and in one of the gears in the L/IC design), only the central portion of each tooth, when viewed in the pitch plane, is formed with the arc of a single circle; while in the lune design, the entire lengthwise curvature of each tooth surface is the arc of a single circle.

In all preferred designs for our nutating gears, a diametral pitch is selected so that, when the axes of the gears are inclined to each other at the maximum preferred angle, two or more of the mating teeth of each gear will be in mesh simultaneously at each of the two meshing areas shared between the gears. As in conventional gearing design, tooth thickness is selected to assure that expected loads will be safely supported by the number of teeth in mesh.

In the CT and CD designs (and in one of the gears in the L/IC design), the central portions of both tooth surfaces of each mating tooth, when viewed in a pitch plane, are respective arcs that form the opposite sides of a single circle of predetermined diameter.

In the lune design, the arc that forms the entire lengthwise curvature of each tooth surface is also taken from a single circle of predetermined diameter. However, in the lune design, the circle is identical to a particular circle formed on the surface of the sphere on which the pitch circles of each gear are great circles, and its diameter subtends an angle, measured from the center of the sphere, equal to the maximum desired angle of intersection between the gear axes.

The teeth of our gears are preferably made with straight-sided profiles between top and bottom lands, because (a) the mating teeth do not "roll" relative to each other but rather, in a manner somewhat similar to hypoid gears, share sliding contact, and (b) the straight tooth sides lengthen the contact pattern on the mating teeth. However, other profiles may be used; and although an involute profile would be relatively incompatible with the CT, CD, and L/IC designs, it is quite compatible with the lune design.

Our special nutating gear designs can readily withstand quite large rotational forces when used in high speed/high pressure machines, and they prevent the rotation of the swash-plate wobbler while permitting its smooth lemniscate nutation; and this is accomplished with only a single pair of our gears which occupy relatively little space. In addition to our special nutating gear designs for supporting its swash-plate, the hydraulic machine disclosed herein includes various sliding-shoe bearing arrangements that permit further remarkable reductions in the size and weight of the machine.

Also disclosed is a modular design for our hydraulic machine in which the housing comprises three distinct units, namely, a cylinder unit and an end cap, each removably attached to a respective end of a central unit in which the swash-plate assembly is located. In addition to including the fixed cylinders, the cylinder unit also houses the ports, passageways, and valving necessary for controlling the hydraulic fluid; and a cartridge bearing for supporting the drive element is mounted at the end of the central unit in proximity to the end cap. The horsepower rating of our modular hydraulic machine can be readily altered, without modifying the end cap or its adjacent bearing and without modifying the swash-plate assembly or any portion of the cylinder unit except for the axial dimension of its cylinders. All that is required for substantially changing our machine's displacement (e.g., from 7 cu. in. to 11 cu. in.) is alteration of the maximum inclination of the swash-plate (e.g., from 18° to 30°) by (a) the modification of only the axial length of the cylinders in the cylinder unit, (b) the replacement of the central housing unit with a similar central unit of identical radial dimension but a modified axial dimension, and (c) relatively modifying the drive element and the pistons only in their respective axial dimensions.

With these inventive structures, our hydraulic machine provides relatively high horsepower in a remarkably small format; i.e., it remarkably exceeds the horsepower densities of present commercially-available units of similar physical dimensions.

DRAWINGS

FIG. 1 is a schematic and partially cross-sectional view of the split swash-plate of a hydraulic machine with many parts omitted for simplification, the wobbler of the swash-plate being restrained from rotation by a pair of our nutating gears.

FIGS. 2A, 2B, and 2C illustrate schematically the relative motion between sets of tooth contact points on the pitch surfaces of a pair of our nutating mating gears arranged in the manner generally indicated in FIG. 1 with the external gear nutating about the fixed internal gear, the axes of the gears being inclined to each other at a selected maximum angle.

FIG. 3 is a graphic-type representation of the relative motion between one of the respective sets of tooth contact points illustrated in FIGS. 2A, 2B, and 2C.

Figure 8C:
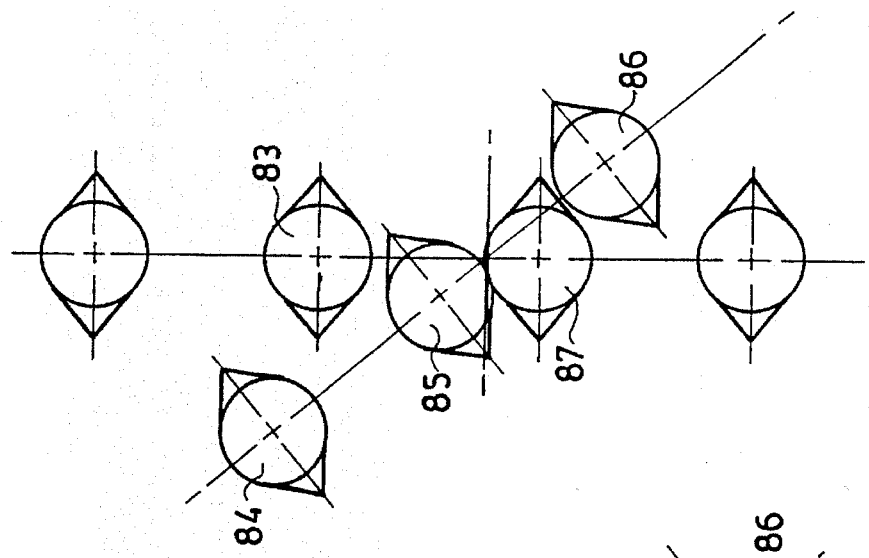
Figure 8B:
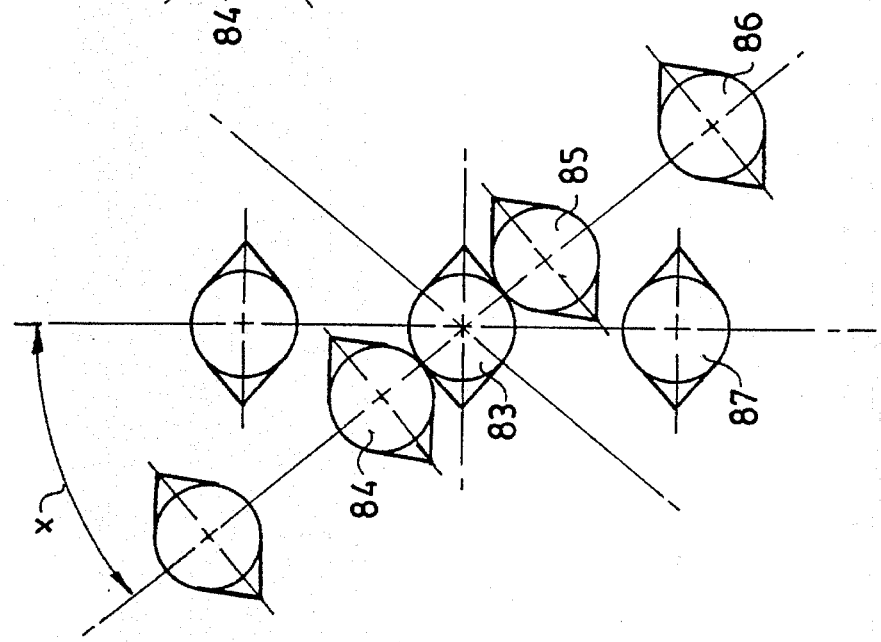
Figure 8A:
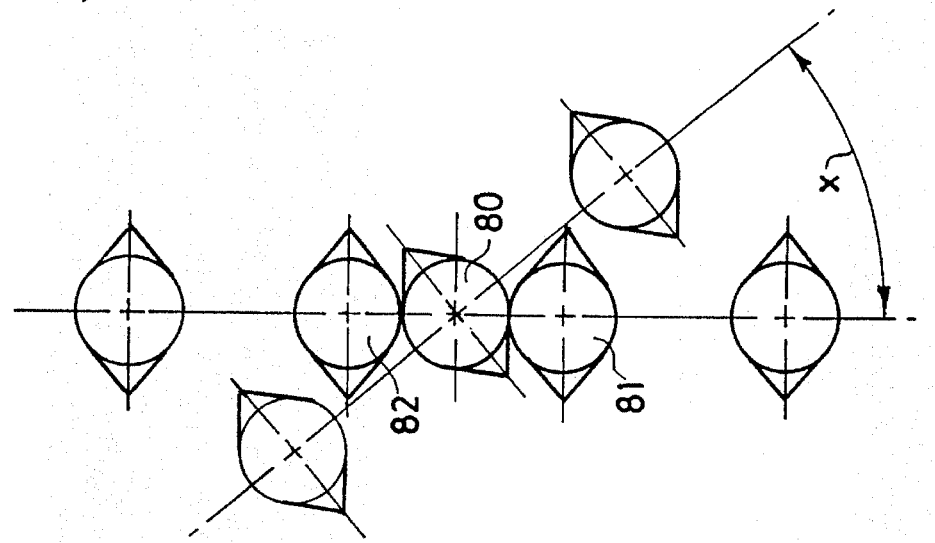

FIGS. 8A, 8B, and 8C are schematic representations of the outlines of the meshing teeth of a pair of nutating gears according to the invention's CT design, the outlines being shown in modified flat projections, and the pair being shown with their axes intersecting at the preferred maximum angle x; FIGS. 8A and 8B represent, respectively, two of the meshing areas, centered 180° apart, where the gears are in simultaneous contact at the same instant in time, while FIG. 8C represents the meshing area shown in FIG. 8B after the center of the meshing area has nutated around the pitch circles of the gears a further distance of three-quarters of the circular pitch.

Figure 9A:
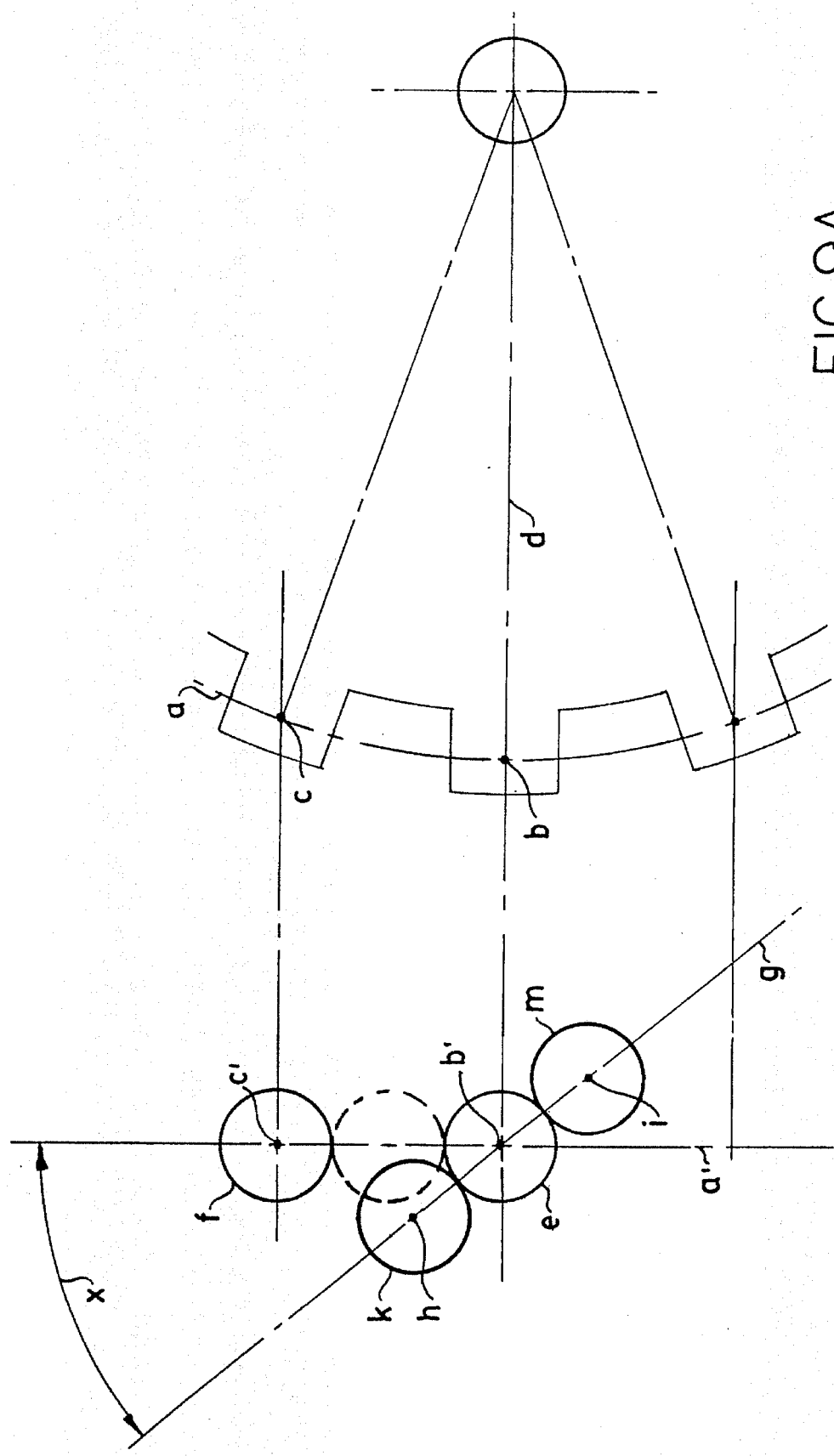
Figure 9B:
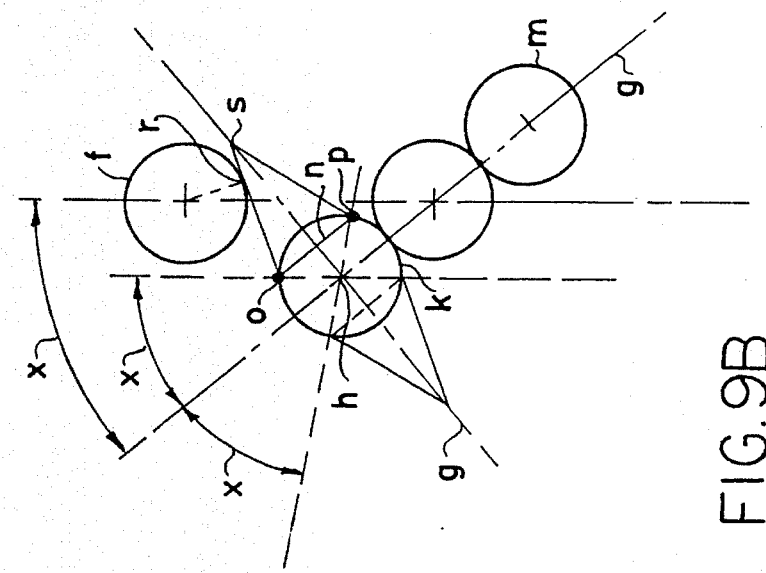

FIGS. 9A and 9B show geometric constructions for determining the tooth shape of a pair of gears according to the invention's CD design.

Figure 10:
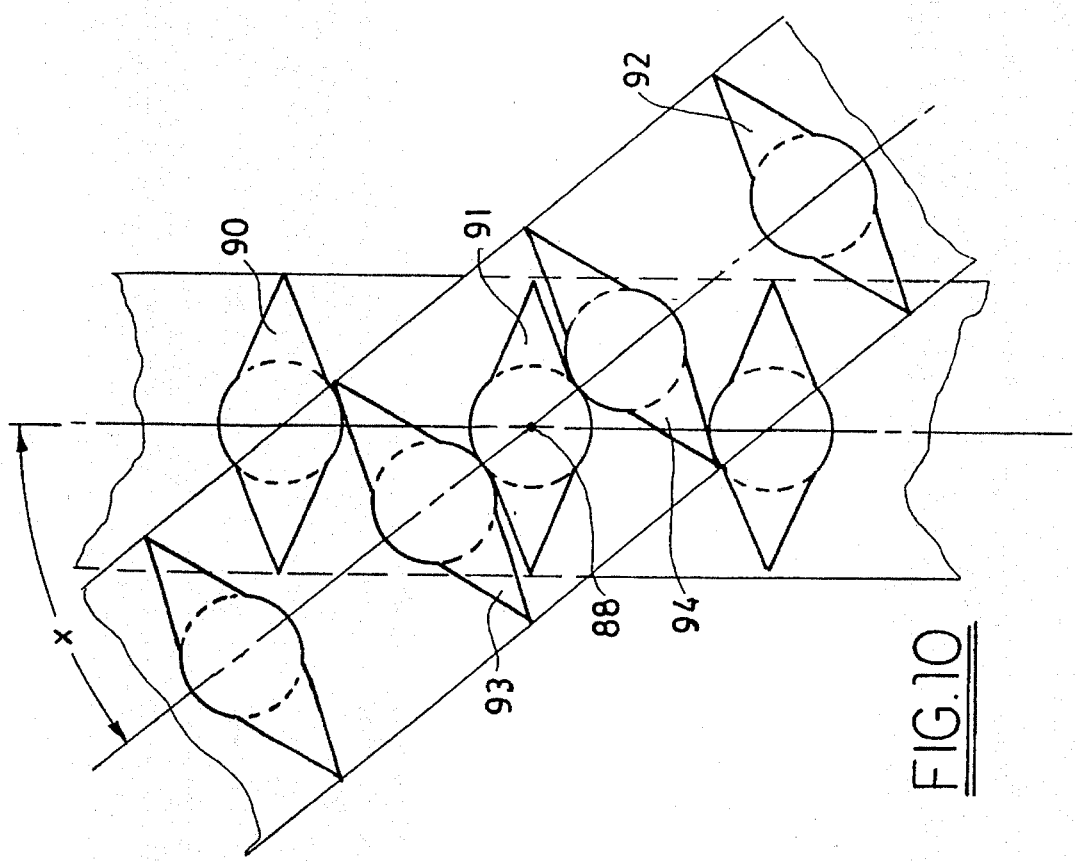

FIG. 10 is a schematic representation of the outlines of the meshing teeth of a pair of gears according to the invention's CD design, the outlines being shown in modified flat projections.

Figure 11:
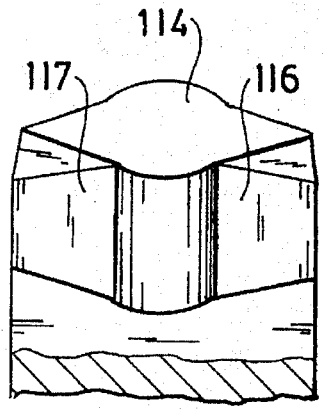

FIG. 11 is a schematic representation of the very slight tip-relief clearance required on CD and CT design teeth, the tip relief being shown greatly exaggerated in the the illustration.

Figure 12B:
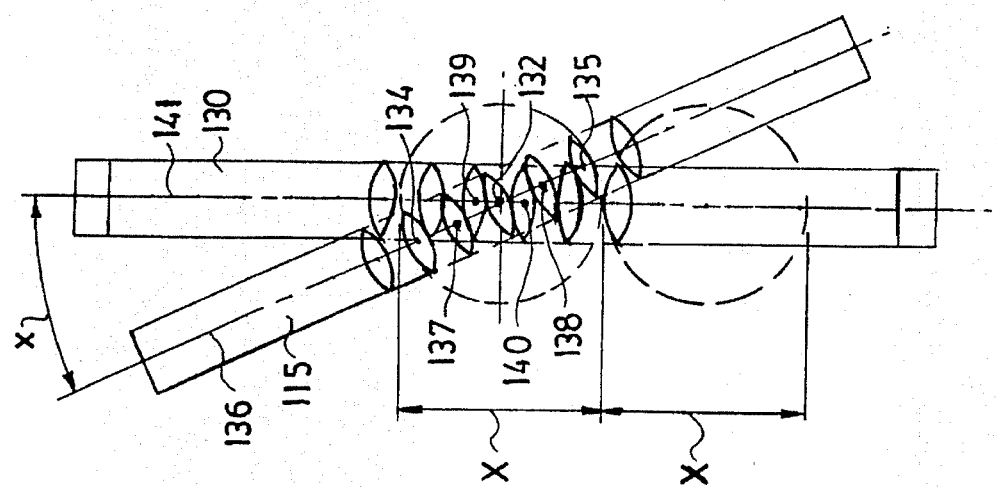
Figure 12A:
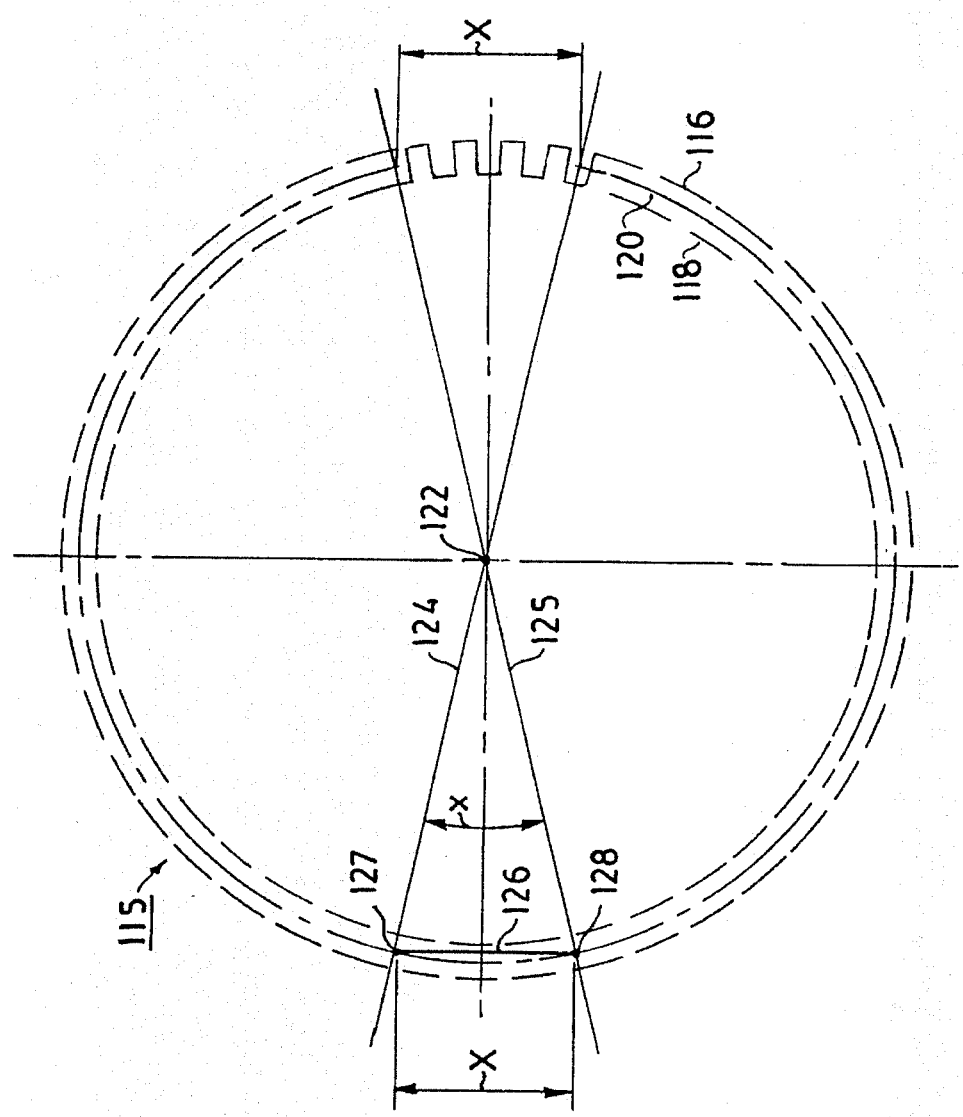

FIGS. 12A and 12B are schematic representations of gear teeth shaped according to the invention's "lune" design, FIG. 12A showing the geometric construction for determining the circular arc that forms the lengthwise curvature of each tooth face, and FIG. 12B showing two sets of meshing teeth as the gears nutate with their axes variably intersecting at a selected maximum angle, the outlines of the gear teeth again being shown in modified flat projections.

Figure 13A:
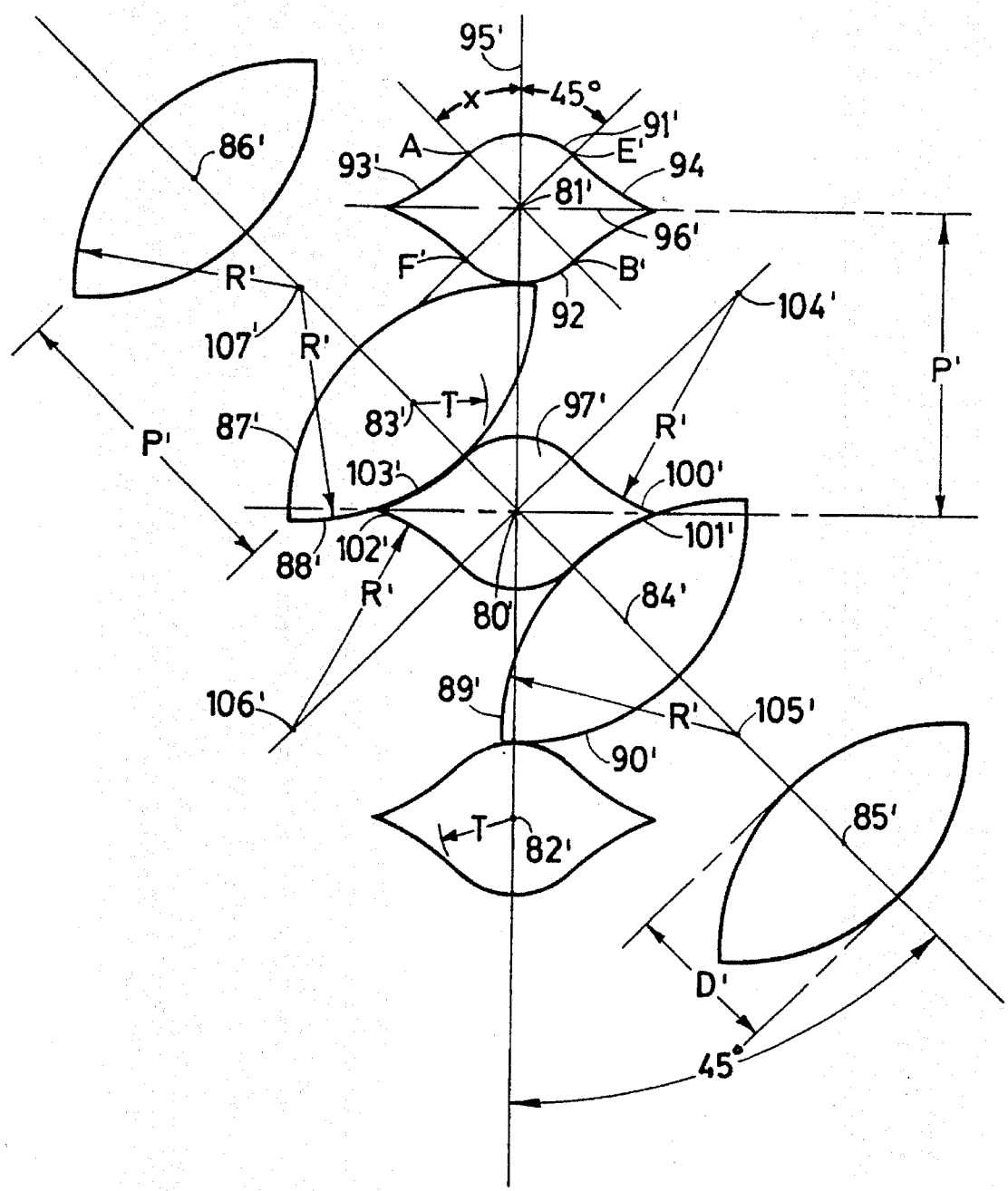
Figure 13B:
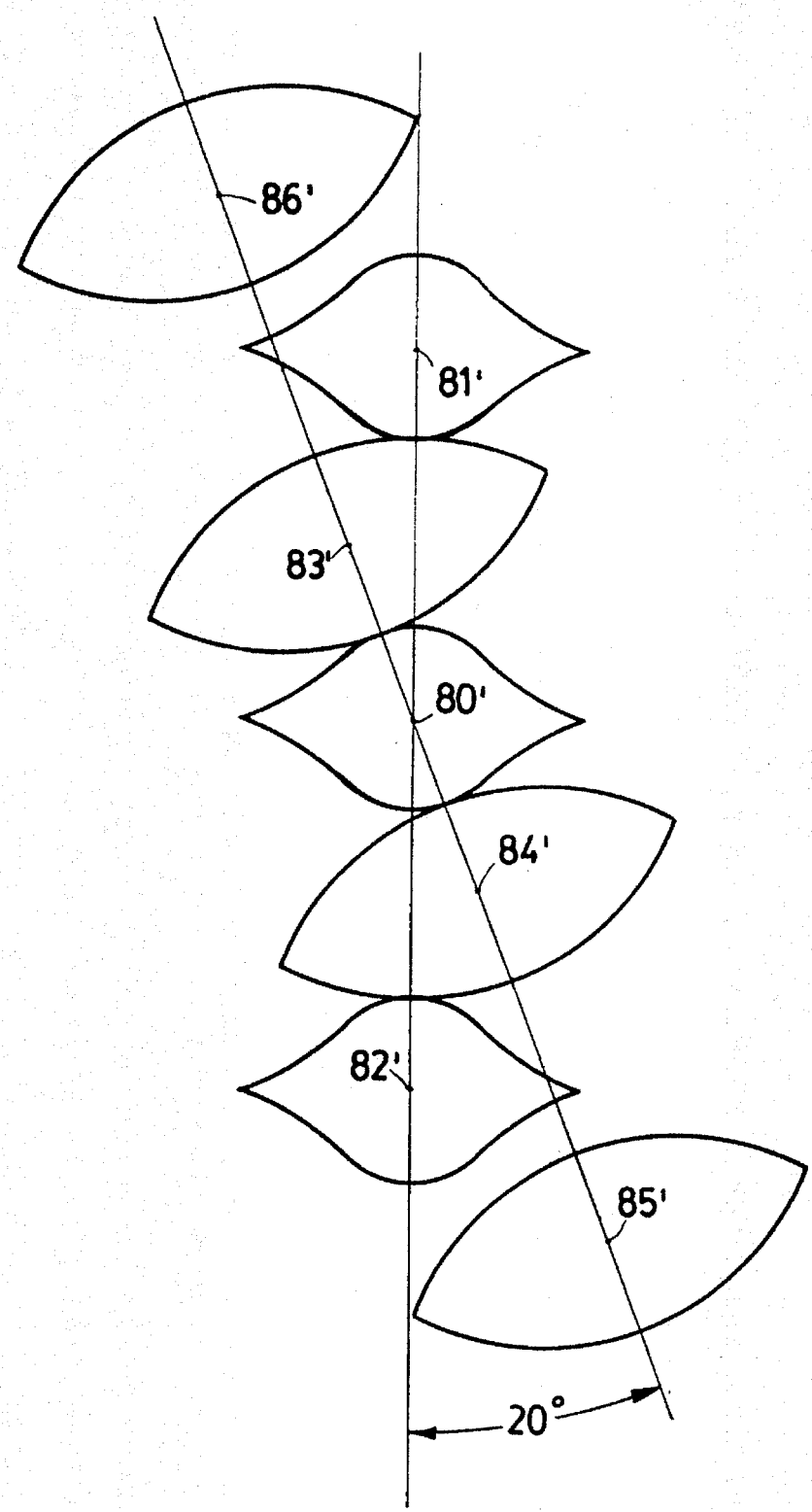

FIGS. 13A and 13B are schematic representations of the outlines of the meshing teeth of a pair of gears according to the invention's L/IC design, the outlines being shown in modified flat projections of the pair; in FIG. 13A the axes of the gears are intersecting at a preferred maximum angle, while in FIG. 13B the axes are intersecting at 20°.

Figure 14:
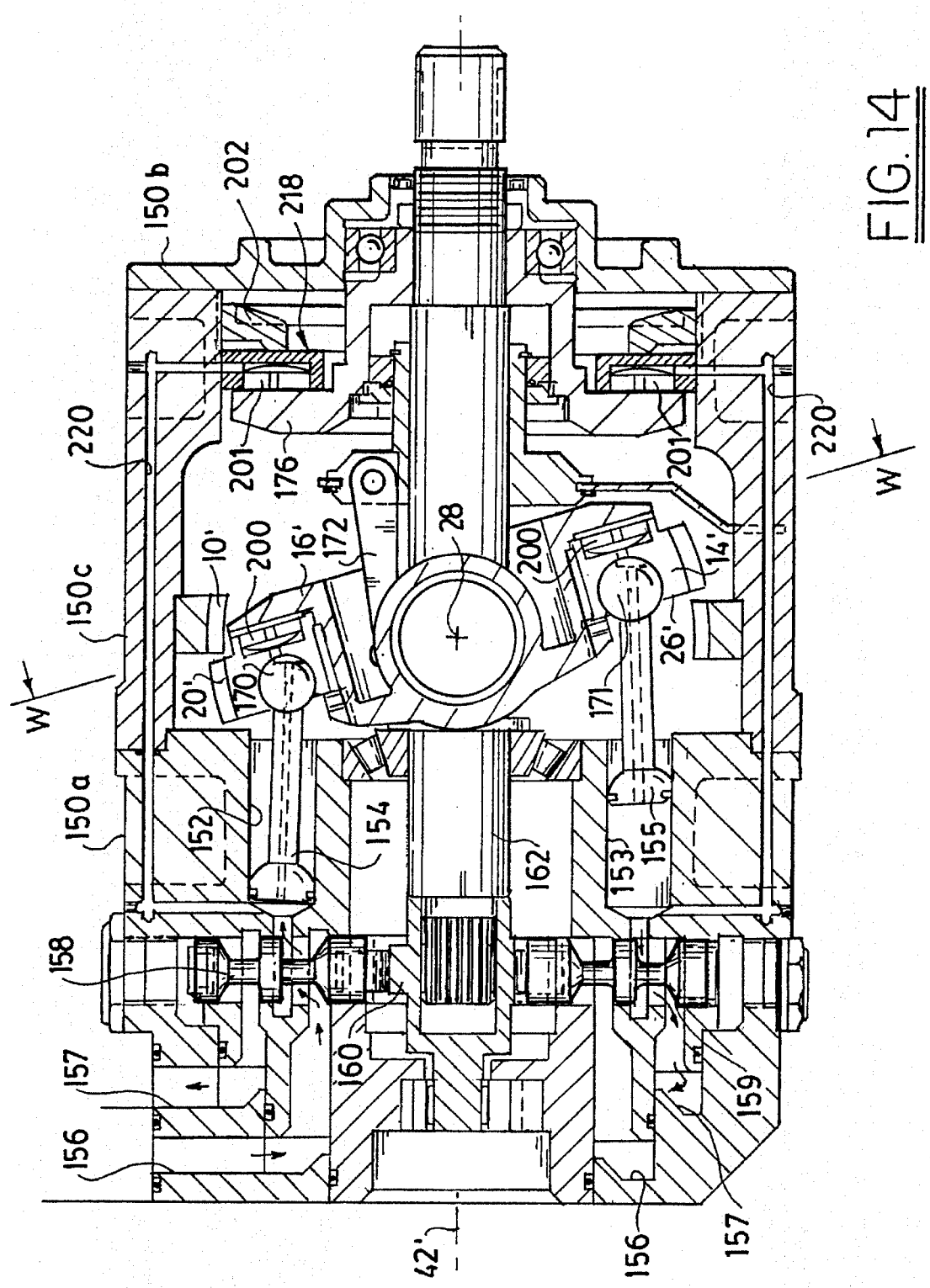

FIG. 14 is a partially schematic cross-sectional view of a hydraulic machine with a swash-plate mounting assembly according to the invention, the inclination of the swash-plate being adjustable; a servo-mechanism for adjusting the inclination of the swash-plate is omitted.

Figure 15:
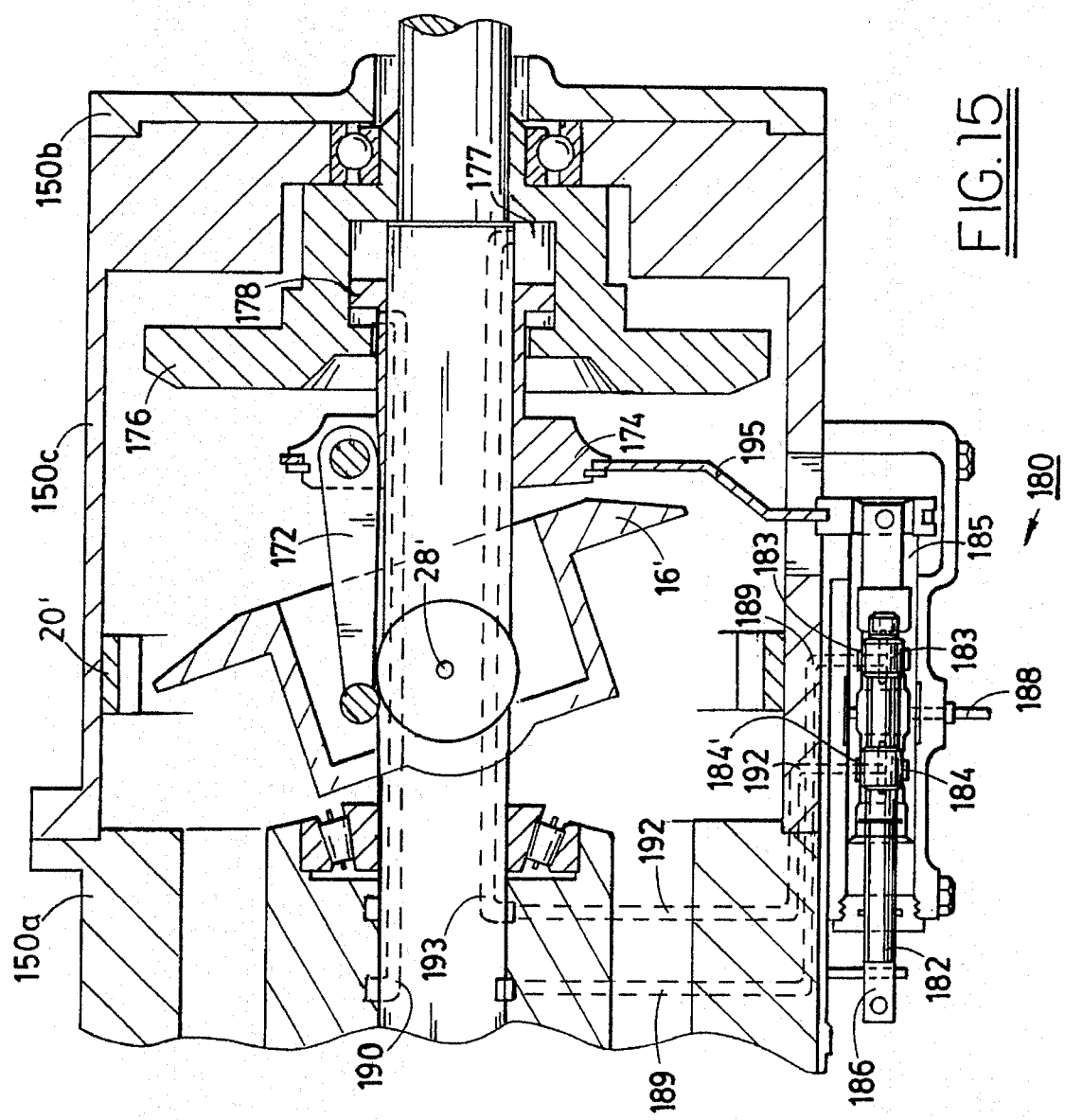

FIG. 15 is a relatively schematic illustration of a servo-control arrangement for adjusting the inclination of the swash-plate mechanism of the machine shown in FIG. 14, showing the swash-plate portion of the machine with many parts shown in FIG. 14 being removed for simplification and clarity.

Figure 16:
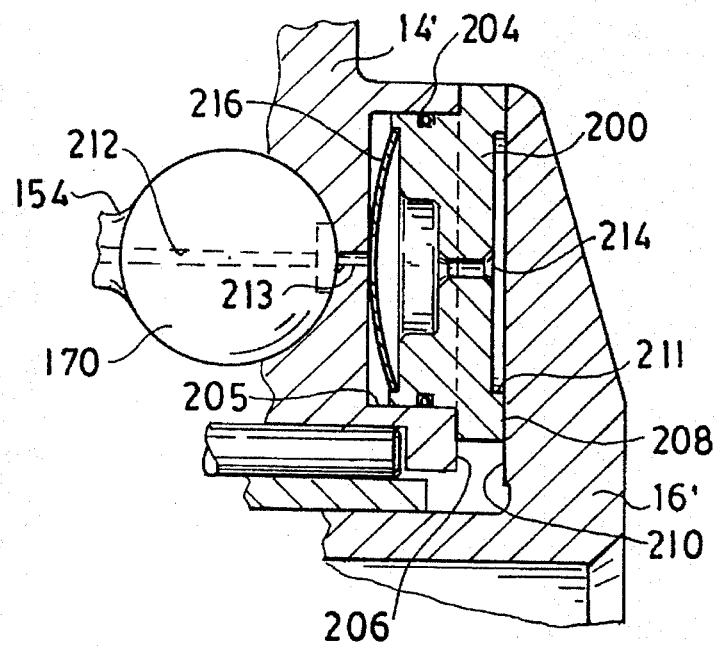

FIG. 16 is an enlarged detail of the hydraulic machine of FIG. 14, showing the invention's pressure-balanced sliding shoe bearing assembly portion of the swash-plate mounting.

Figure 17:
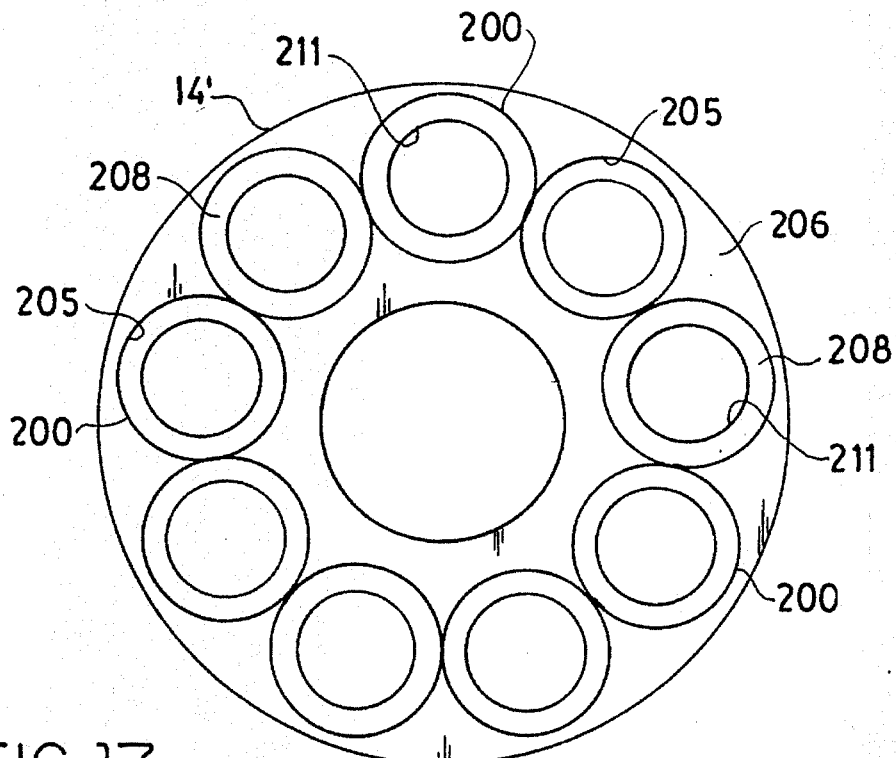

FIG. 17 is another detail of the hydraulic machine of FIG. 14, the view being taken along the plane W—W and showing only the invention's pressure-balanced sliding shoe bearings mounted in the back face of the wobbler portion of the split swash-plate mounting.

Figure 18:
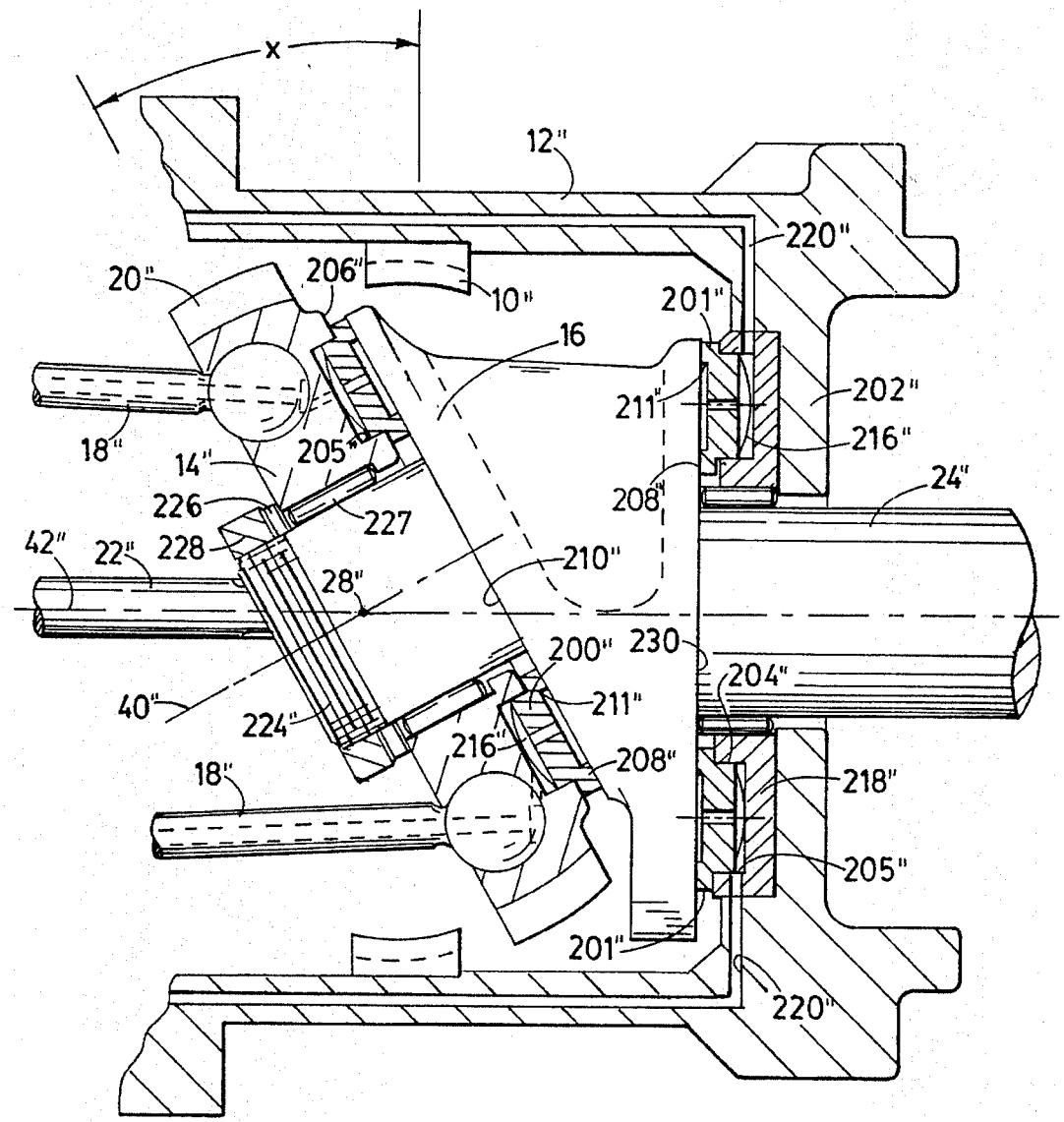

FIG. 18 is a schematic illustration of a fixed-angle swash-plate assembly according to the invention.

DETAILED DESCRIPTION OF PREFERRED EMBODIMENTS

NUTATING GEAR SYSTEM

As indicated above, the primary feature of our hydraulic machine is the pair of nutating gears that we use to restrain the rotation of the wobbler portion of the swash-plate. FIGS. 1 through 5 illustrate the general characteristics of these special nutating gears.

Figure 1:
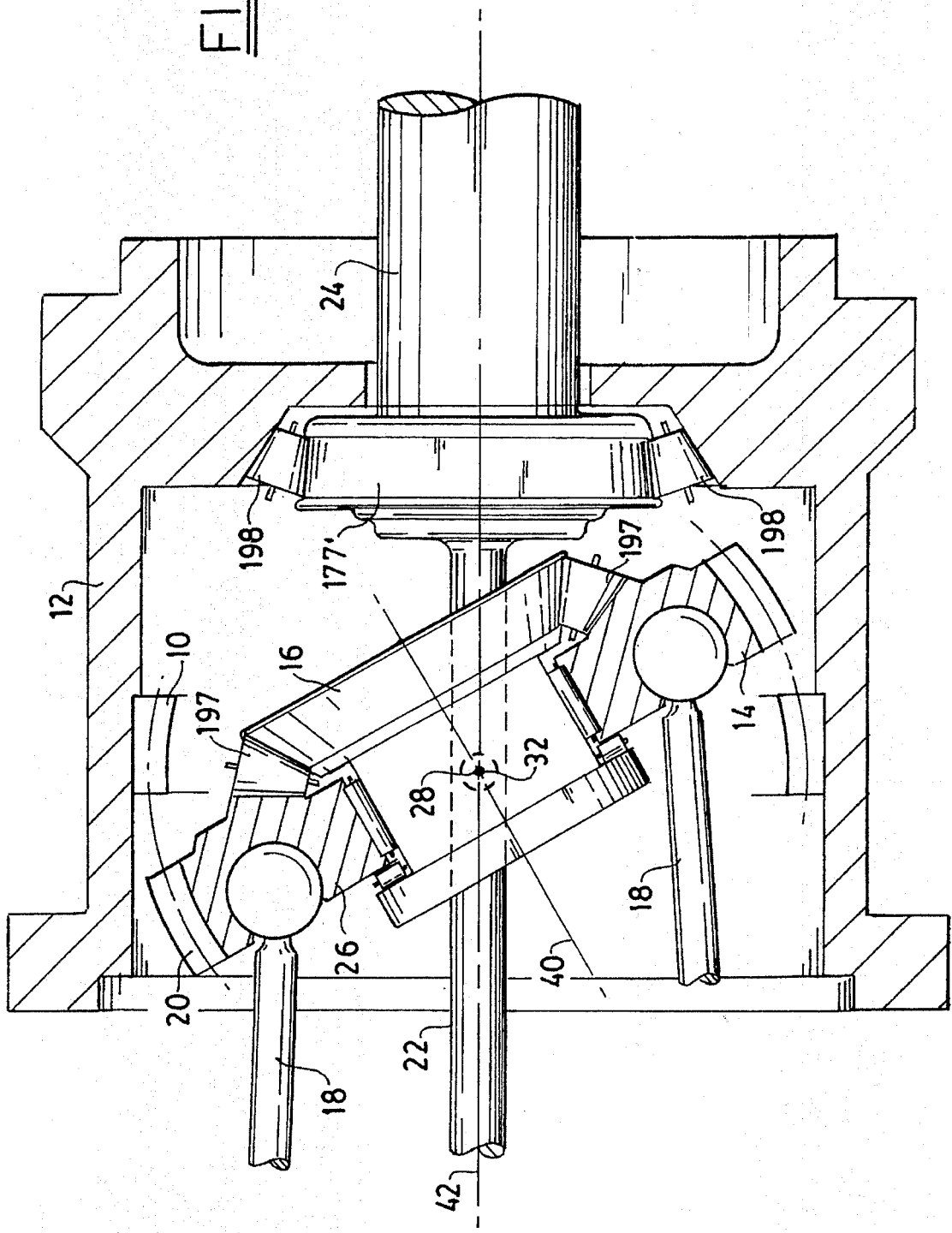

In FIG. 1, which is a schematic and partially cross-sectional view of the swash-plate assembly of a hydraulic machine with many parts omitted for simplification, an internal gear 10 is fixed to a housing 12. A mating external gear 20 is fixed to the outer circumferential surface of a wobbler 14 which cooperates with a rotor 16 to form a split swash-plate. Namely, wobbler 14 receives and supports the ends of pistons 18 mounted in respective cylinders (not shown in this drawing), while rotor 16 rotates with a shaft 22 of a drive element 24.

The axis 40 of external gear 20 is perpendicular to the front face 26 of wobbler 14, and axis 40 intersects the rotational axis 42 of drive element 24 at point 28, which is also the effective center about which rotor 16 is inclined to rotational axis 42. The axis of internal gear 10 is coincident with rotational axis 42.

Among the many parts omitted from this schematic illustration is an appropriate mechanism for adjusting the inclination of rotor 16 relative to rotational axis 42 in a manner well known in the art and as shown in the more complete embodiment of our hydraulic machine as is described below. For purposes of appreciating the nutating gear feature of our invention, it should be assumed that the angle of inclination of rotor 16 relative to rotational axis 42 can be varied continuously from the angle shown in the drawing, back through 180° (i.e., where axes 40 and 42 are coincident), to an angle of equal magnitude less than 180°.

As rotor 16 rotates with shaft 22, axis 40 nutates about axis 42. As will be understood from the further explanation below, at all times during such relative angular nutation between their axes, the pitch circles of gears 10 and 20 remain in mesh at two meshing points on the surface of the same pitch sphere, the center of each meshing point being located on a line passing through the center of the pitch sphere which is coincident with the point of intersection of the two axes. For instance, at the moment in time pictured in FIG. 1, the centers of the two mesh points of gears 10 and 20 are located on a line 32 perpendicular to the page of the drawing and passing through point 28. Further, when axes 40 and 42 are aligned coincidentally at 180°, all of the teeth of both gears 10 and 20 are in full mesh in a manner similar to known gear couplings. This full mesh condition can be seen in the portion of gears 10 and 20 illustrated in FIG. 4.

However, whenever the relative angular orientation of their respective axes is variably adjusted out of 180° alignment (as shown in FIG. 1), the teeth of the gears continuously move into and out of mesh as gear 20 nutates about axis 42 and gear 10. This relative nutational movement of gears 10, 20, into and out of mesh, is shown schematically in FIGS. 2A, 2B, and 2C which represent, respectively, the pitch cycles of the gears in three different positions of relative nutation when axes 40, 42 are intersecting at some preferred maximum angle x. FIGS. 2A, 2B, and 2C show the relative position of four different respective sets of tooth contact points as the mating teeth of the nutating gears move into and out of mesh.

In FIG. 2A, a tooth contact point A on internal gear 10 is in mesh with tooth contact point A' on external gear 20 and, simultaneously, a tooth contact point C on internal gear 10 is in mesh with a tooth contact point C' on external gear 20. FIG. 2B shows the same tooth contact points on each gear after the gears have nutated 90°, the gear tooth contact points D and B of gear 10 and points D' and B' of gear 20 now being in meshing contact. Following a further one-quarter nutation, as shown in FIG. 2C, gear 20 has moved through one-half of its nutation about gear 10, and tooth contact points A, A' and C, C' are once again at mesh, etc.

The tooth contact points represented in FIGS. 2A, 2B, and 2C are all located on the pitch circles of their respective gears and, geometrically, these pitch circles are each great circles on the same sphere. All great circles intersect each other at two positions 180° apart. FIG. 3 is a schematic representation of the relative motion between one of the respective sets of tooth contact points illustrated in FIGS. 2A, 2B, and 2C, namely, tracing the relative movement of tooth contact points A, A' as gears 10, 20 make one full nutation together. Although the respective pitch circles are shown in flat projection in FIG. 3, it can be seen that each tooth contact point effectively becomes a pole of the pitch sphere twice in each nutation, and the relative positions of each pair of shared contact points trace a lemniscate-like pattern (i.e., a "figure-eight on the surface of a sphere"); and, as is well known in the universal joint art, such lemniscate motion is essential in order to transfer constant velocity between two articulated shafts.

Figure 4:
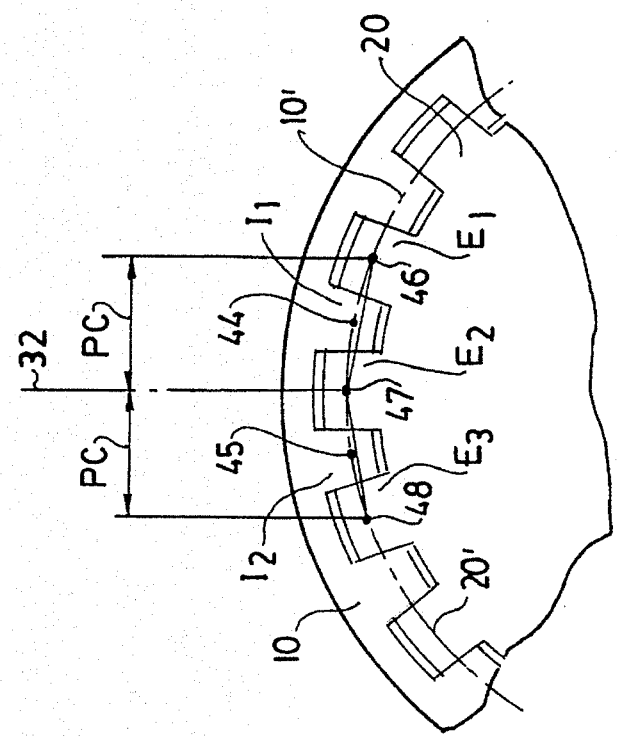
FIG. 4 is a schematic representation of a portion of the pair of mating gears of FIG. 1, showing the gears in an axial view with their respective axes aligned in coincidence (i.e., at 180°) and indicating the projected chordal center distance between successive teeth on the pitch circle of each gear.

As indicated above, FIG. 4 schematically represents a portion of the pair of nutating gears of FIG. 1, showing internal gear 10 and external gear 20 with their respective axes aligned in coincidence at 180°. In this position, respective pitch circles 10' and 20' are also coincident. Indicated on the coincident pitch circles are tooth centers 44 and 45 of internal gear teeth $I_1$ and $I_2$, respectively, and tooth centers 46, 47, and 48 of external gear teeth $E_1$, $E_2$, and $E_3$, respectively. Also shown are the projected chordal center distances PC between successive tooth centers 46, 47 and tooth centers 47, 48.

Figure 5:
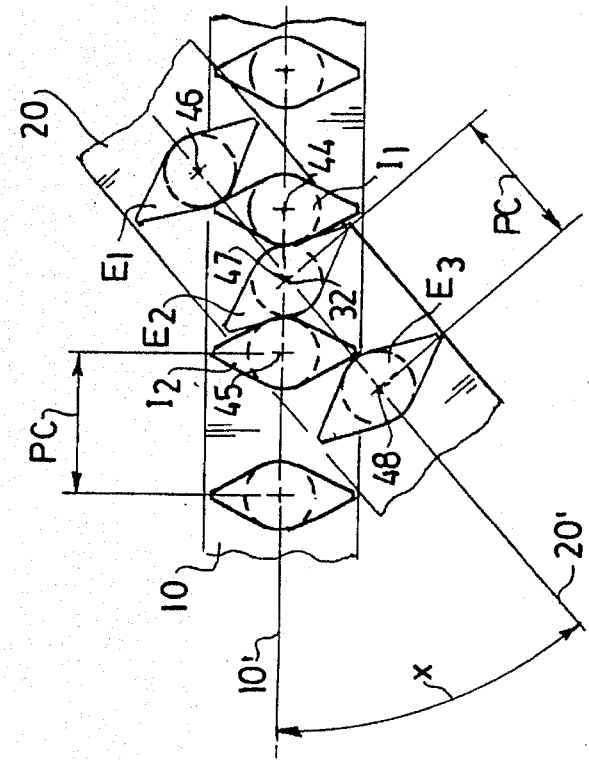
FIG. 5 is a schematic representation of a portion of the same pair of gears shown in FIG. 4 variably intersecting (as in FIG. 1) at a selected maximum preferred angle x, showing their meshing teeth in a modified flat projection as the gears nutate about their respective axes.

FIG. 5 schematically represents approximately the same portion of gears 10, 20 as shown in FIG. 4. However, in FIG. 5, the gears are shown with their axes variably intersecting (as in FIG. 1) at selected maximum preferred angle x, and the gear teeth are represented in modified unwound flat projections of the pitch sphere of each respective set of gear teeth. The flat projections are modified so that the center distance between successive teeth on each flat projection equals the projected chordal distance PC between tooth centers.

[NOTE: With reference to the flat projections and plane geometric constructions used to illustrate our tooth forms, it must remembered our gear system is based upon spherical geometry. That is, the projections onto the flat surfaces of our drawings represent lines on the surface of the respective sphere on which the pitch circle of the gear is a great circle. For instance, referring to the representation of the internal/external gear combination in FIG. 5, the flattened projections of the teeth of gears 10 and 20 are on the surface of the same pitch sphere.]

When gears 10, 20 are nutating together with their respective axes variably intersecting at the preselected preferred maximum angle x, their two centers of meshing engagement follow line 32 as it spins about pivot point 28 (see FIGS. 2A, 2B, and 2C); and FIG. 5 shows that even at this maximum angle, the load being transferred between the gears is shared by ten teeth. That is, while only five teeth are shown in meshing engagement in FIG. 5, as explained above, gears 10, 20 are simultaneously in mesh at all times about two meshing centers located 180° apart.

It is important to understand that our gears are quite different from conventional gearing; and with their two simultaneous meshing centers, they do not nutate in the manner well known with prior art gearing systems. Similarly, conventionally-designed gear teeth are not appropriate for our hydraulic machine invention disclosed herein. It is necessary to use the unique gear tooth designs which we have developed for our novel "Variable-Angle Gear System" invention identified above, and such designs are described below for application in the invention being disclosed herein.

GEAR TOOTH DESIGNS

The following tooth designs are appropriate for the nutating gears of this invention.

(a) Basic Design Elements

Figure 6:
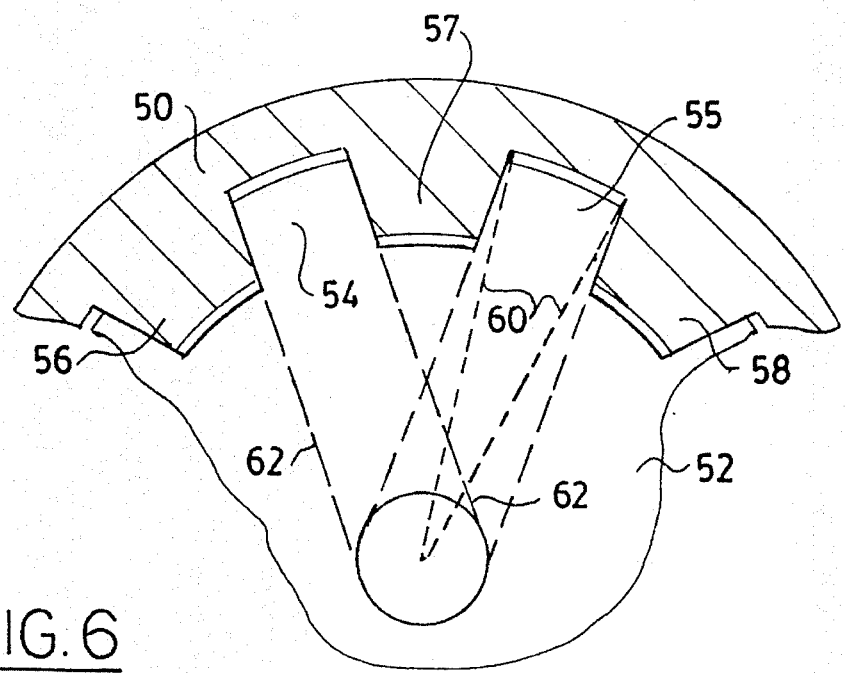
FIG. 6 is a schematic representation of the partial outline of the meshing teeth of a pair of gears according to the invention taken in the radial center plane of the gears with axes aligned at 180°.

Referring to FIG. 6, the partial outline of the meshing teeth of a pair of gears 50, 52 according to the invention is represented schematically and, for clarity, external gear 52 is not shown in cross section. The axes of the gears are aligned at 180°, and the outline is taken in the radial center plane of the gears. Two external gear teeth 54, 55 are shown in full mesh with three internal gear teeth 56, 57, 58.

As can be seen in FIG. 6, the working surfaces of all the gear teeth are straight-sided. This is the preferred profile shape. As just explained above, whenever the axes of our gears are positioned out of the 180° alignment so that there is some nutation, the gears are constantly moving into and out of mesh about their two shared meshing centers. This movement causes the surfaces of the meshing teeth to slide over each other in a manner somewhat similar to the sliding contact that occurs between the meshing teeth of hypoid gears. The preferred straight-sided tooth surfaces create a full line of sliding contact through the mesh. Further, while the straight-sided teeth can be designed to follow radial lines 60, a spline shape (indicated by lines 62) is preferred. However, the gear system of the invention is spherical and, when viewed in an axial plane (not shown), the straight sides of the teeth of gear 50 all follow radial lines toward the center of the pitch sphere.

Figure 7:
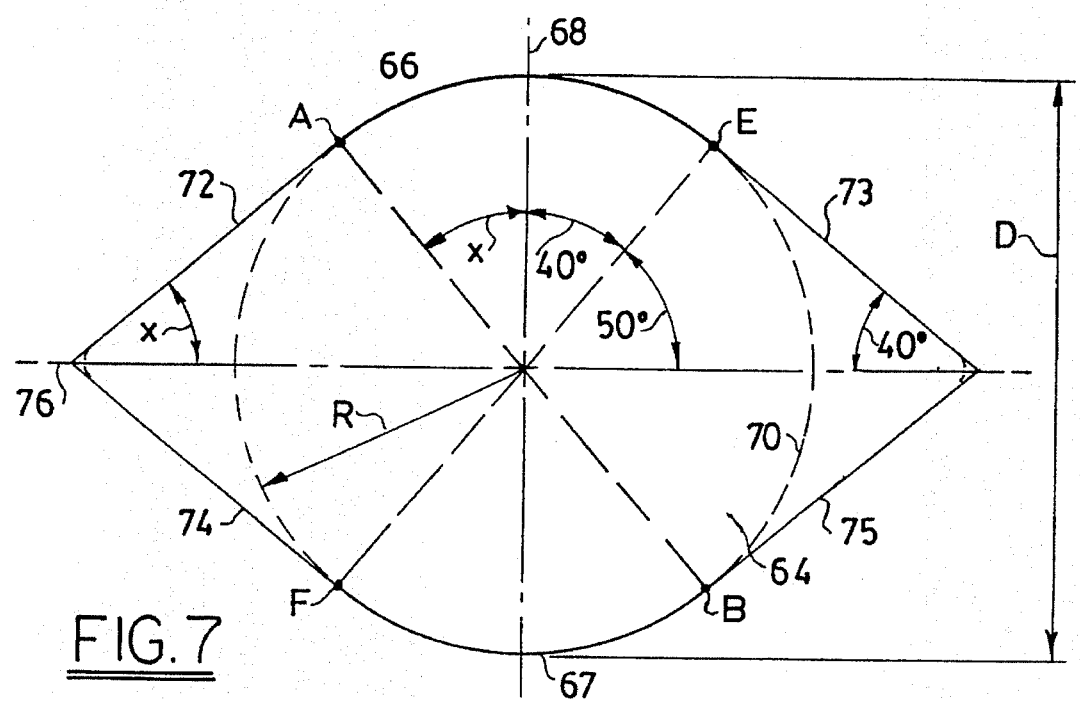
FIG. 7 is a schematic representation of the outline of a gear tooth according to the invention's CT design, the outline being shown in a pitch plane of its gear.

There is another characteristic common to gear teeth according to our invention, and this will be illustrated by using as an example a gear tooth formed according to the invention's CT (circle-tangent) design. FIG. 7 is a schematic representation of the outline of a CT gear tooth 64, the outline being shown in a pitch plane of its gear. This CT tooth, like all teeth according to our invention, includes the following basic design characteristic: The central portions 66, 67 of the working surfaces of tooth 64, on each side of its radial center line 68, are formed by the arc of a single circle 70 having a diameter selected so that, when its gear is nutating under load, the intersection of the axes of the mating gears can be varied continuously from an alignment of 180° throughout the range of angles extending to some preselected maximum preferred angle on each side of 180°. The circular arcs that form the central portions of the two working faces of each CT, CD, and IC tooth are formed on the same circle; however, while the two working faces of each lune tooth are arcs of circles having the same diameter, they are not formed on the same circle. These features are discussed in greater detail below.

In addition, the diameter for the required single circle in all of our designs is selected to assure that more than two mating teeth shall be in mesh simultaneously about each of the meshing centers shared by the mating gears. The selection of the diameter of the single circle will be described, along with other parameters, in the following explanations of four preferred tooth designs for our invention.

(b) CT (Circle-Tangent) Tooth Design

As just explained above and as can be seen in FIG. 7, the design of our CT gear teeth begins with the selection of a single circle. This first step is approached in the same manner as is well known in the gearing art, namely, size and strength specifications for our gear pair are initially determined in accordance with the pressure, horsepower, and application (e.g., constant-duty cycle industrial, automotive drive, etc.) in which our swash-plate assembly and hydraulic machine are to be used. Namely, the addendum circle (maximum diameter) of the gears may be limited by the physical space in which the gearing must operate, and a diametral pitch must be selected so that the normal chordal thickness of the teeth (i.e., the chordal thickness of each tooth along the pitch circle) is sufficient to permit the maximum expected load to be carried by the number of teeth in mesh.

In this regard, it is essential to remember that a pair of our nutating gears is capable of handling twice the load as a pair of conventional gears of the same size. That is, since our gear pairs share two meshing areas centered 180° apart, they have twice as many teeth in mesh as would a conventional gear of the same size, and a diametral pitch may be selected that provides a normal chordal thickness that is significantly smaller than would be conventionally required.

Referring again to FIG. 7, following the selection of an appropriate addendum size and diametral pitch, a single circle 70 is used to form the central portion of the tooth. Circle 70 has a radius R which produces a circle having the required normal chordal thickness D along radial center line 68.

Next, it is preferred to extend the lengthwise face width of each gear sufficiently to assure that more than two teeth will be in mesh about each of the two meshing centers shared by our gear pair. To accomplish this, an initial determination is made regarding the angular variability that will be required for the particular application. For instance: many swash-plate specifications may require no more than 15°, while for other uses even more than 30° may be desirable. As indicated above, we refer to this desired angular variability as the "preferred maximum angle x".

In the example illustrated in FIG. 7, it is assumed that the preferred maximum angle x is 40°. The angle x is marked off on each side of radial center line 68 (indicated by the construction lines between points AB and EF) so that points A and E measure respective tooth surface angles x (in this example, 40°) on each side of center line 68 on tooth surface 66, and points F and B measure the same tooth surface angles on tooth surface 67.

Each respective tooth surface 66, 67 is then extended by constructing tooth surface extension portions outlined by straight lines 72, 73 and 74, 75, respectively, each of which is drawn tangent to a respective tooth surface angle point A, E, F, B. Each extension line 72, 73 and 74, 75 is respectively extended from its point of tangency toward a projected intersection with the axial center line 76, completing the construction of the tooth surface extension portions. In the final tooth form, the sharp ends of these extension portions are preferably chamfered as indicated in dotted lines.

Since each extension line 72, 73 and 74, 75 is perpendicular to the respective radial line drawn to its point of tangency, it will be noted by simple geometric analysis that the angle formed between each extension line and axial center line 76 is also equal to x (in this instance, 40°).

Teeth proportioned according to this CT design will slide properly into and out of mesh as our gears nutate at variably intersecting angles. Also, this CT design assures that, at one or both of the gear pair's centers of meshing engagement, more than two mating teeth will carry the load even when the axes of the gears are intersecting at the maximum preferred angle.

Further, if the diametral pitch is selected so that each gear has an odd number of teeth, this design assures that more than two mating teeth will carry the load about both of the gear pair's centers of meshing engagement when the gears are intersecting at the maximum preferred angle. This latter condition is illustrated schematically in FIGS. 8A and 8B which represent the outlines of the meshing teeth of a pair of gears according to the invention's CT design, the outlines being shown in modified flat projections, and the pair being shown with their axes intersecting at the preferred maximum angle x.

FIG. 8A represents a first one of the meshing areas of a CT gear pair designed according to the method just described above, while FIG. 8B shows the second meshing area of the same gear pair at the same instant in time. Once again, for purposes of illustration, it is assumed that the gear teeth have been designed for a preferred maximum angle of x°. As indicated above, this provides an angular range that extends x° to each side of the position where the axes are coincident, thereby creating a total articulation of twice x°.

In FIG. 8A, the center of an external gear tooth 80 is positioned at the center of the first meshing area, and external gear tooth 80 is in contact with internal gear teeth 81, 82. At the same instant of time, at the second shared meshing area shown in FIG. 8B, the center of an internal gear tooth 83 is positioned at the center of the meshing area, and internal gear tooth 83 is in contact with external gear teeth 84, 85. Thus, when the shafts being interconnected by the gear pair are intersecting at the maximum angle, six gear teeth are sharing the load.

FIG. 8C represents the second meshing area shown in FIG. 8B at a moment in time after the gears have each nutated a further distance of three-quarters of the circular pitch. At the time illustrated in FIG. 8C, the radial center line of external gear tooth 86 has come into contact with the right hand extension portion of internal gear tooth 87, and the line of contact between these two teeth begins its sliding movement to the right (as viewed in the drawing) along the front face of tooth 86 and to the left along the rear face of tooth 87. At the same time, the line of contact between internal gear tooth 87 and external gear tooth 85 is sliding to the left along the front face of tooth 87 and to the right along the rear face of tooth 85.

As just indicated above, the number of teeth in mesh when the axes of the gears are oriented at the preferred maximum angle x represents the minimum number of teeth in mesh for all expected operating conditions; and when the shafts move into substantial alignment at 180°, the teeth of the two gears are all fully meshed with each other in a coupling-like manner. Therefore, if the selected diametral pitch and normal chordal thickness of the teeth are sufficient to carry expected loads with the number of teeth in mesh at the preferred maximum angle, the gear pair will have appropriate strength under lesser angular orientations.

Persons skilled in the gearing art will appreciate that the possible scoring of the gear tooth faces must be given special consideration in view of the sliding contact between our gears. The tooth surface distance through which each pair of meshing teeth slide relative to each other, as they pass into and out of mesh, is reduced as the shaft angle approaches 180°. Therefore, the sliding velocity decreases as the shaft angle between the gears decreases, and the potential for scoring problems should be minimized if the surface pressure and the sliding velocity between the gear teeth are acceptable at the preferred maximum angle.

(c) Design of CD (Circle-Over-Diamond) Teeth

While there may be other ways to determine the design parameters of gear teeth appropriate for our variable-angle nutating system, we have done this by general geometric construction; and the general geometric construction for our CD teeth, illustrated in FIGS. 9A and 9B, is as follows:

(1) In the same manner as was explained above in regard to our CT teeth, the design of our CD teeth also begins by initially determining required size and strength specifications in accordance with the application in which the gearing is to be used and, therefrom, selecting an appropriate addendum size, diametral pitch, and normal chordal thickness for the teeth.

(2) Following the initial selection of such appropriate basic parameters, a portion of the external gear of the pair is laid out in an axial view in the manner shown in the right hand portion of FIG. 9A. Namely, a portion of its pitch circle a and at least two tooth centers b and c are constructed. A radial line d passing through a tooth center b is selected to mark off the center of a "proposed mesh", and an unwound flat projection a' of a portion of the pitch circle a of the external gear is laid out perpendicular to radial line d.

(3) A projected tooth center b' is marked at the intersection of radial line d and unwound pitch circle a' to serve, as indicated above, as the center of the proposed mesh. Then, a second tooth center c, adjacent to tooth center b, is projected from originally constructed pitch circle a to unwound pitch circle a', being identified as projected tooth center c'.

(4) Next, circles e and f are constructed about tooth centers b' and c', respectively, each circle having a diameter equal to the normal chordal tooth thickness determined by the diametral pitch selected in step (1) above. As those skilled in the art will appreciate, this diameter is also equal to one-half of the projected circular pitch of the gear (as indicated by the dotted circle of the same diameter shown midway between projected tooth centers b' and c').

(5) The unwound flat projection of the pitch circle g of the internal gear of the pair is then drawn through the center b' of the proposed mesh at an angle x which is selected to be equal to the maximum desired angle of intersection between the gear axes, and two new tooth centers h and i are marked on unwound pitch circle g, tooth centers h and i being positioned apart at a distance equal to the projected circular pitch and being centered about mesh center b'. New circles k and m, each having the same diameter as tooth circles e and f, are drawn about centers h and i.

(6) Reference is now made to FIG. 9B which is a continuation of the projected mesh construction begun in the left hand portion of FIG. 9A. Unwound pitch circle g also represents the radial center line of each tooth circle k and m, and the angle x (which equals the preferred maximum angle of intersection between the gear axes) is marked off on each side of center line g on each of the opposite faces of tooth circle k, thereby creating two respective tooth face angles (of x°) on each opposite face of tooth circle k. A chord n is then drawn between the outer points o and p of the respective tooth face angles on one side of tooth circle k, and a bisector q is constructed through tooth center h and chord n.

(7) A line is drawn from point o tangent to the surface of tooth circle f at r and ending at its intersection with bisector q at s. A second line is drawn from point s to point p at the other end of chord n, and the equal sides of the resulting isosceles triangle ops form the basic shape of an extension portion that increases the lengthwise width of the gear tooth in an axial direction on one side of tooth circle k. The bisector q is now extended to form the axial center line of the tooth, and a triangle of identical dimensions is then drawn extending from the outer points of the respective tooth face angles on the opposite side of tooth circle k as shown in FIG. 9B, completing an extension portion in the opposite axial direction.

(8) The outline of this apparent "circle-over-diamond" tooth shape, as constructed about tooth center k in the manner just described, is then used for the shape of the teeth (when viewed in a pitch plane of the gear) of both gears in a mating CD pair. Of course, as appreciated by those skilled in the art of gear design and manufacture, while our final CD tooth shape is substantially in this form, minor modifications must be made for tip relief, clearance, edge and surface smoothing, etc.

A set of such meshing CD teeth are illustrated schematically in FIG. 10 with the gears positioned about a center of mesh 88 and with the axes of the gears oriented at a selected preferred maximum angle of intersection of x°. At this maximum angle, it can be seen that three internal gear teeth 90, 91, 92 are in contact with two external gear teeth 93, 94. Therefore, like our other tooth designs, more CD teeth are in mesh at all times to support expected loads than would be true with conventional gear systems.

Our CT, CD, and L/IC gears share another design feature, namely, all require a very slight tip relief for clearance. In FIG. 11, such tip relief is shown, in greatly exaggerated form, in a schematic perspective: a tooth face of an external gear CD tooth 114 has the upper addendum of each of its respective extension portions 116, 117 chamfered slightly, the depth of the chamfer increasing from zero, at the radial center line of the tooth, to a maximum at the outside edge of the tooth face as it meets the axial center line of the tooth. To provide some appreciation for the amount of relief required: the teeth of an external CT or CD gear with an outside diameter of 10 cm (4") would require approximately 0.2 mm (0.008") maximum tip relief at their outer edges.

Such slight tip relief can be simply generated during the manufacture of our gearing. For instance, in a process in which the gears are initially forged to a "rough-but-near-finished" shape, the forged rough gears can be finished by CBN grinding with a finishing tool having the form of a mating gear without any tip relief.

(d) Lune Tooth Design

Our gear system includes still another gear tooth design that is easily manufactured and has particular utility in some nutating applications. We call this design "lune" because the outline of the entire lengthwise surface of each of the opposite working faces of each tooth is formed by the arc of a single circle; and when viewed in a pitch plane of the gear, the outline of the two working faces of each tooth create a lune-like shape. (Geometrically, a "lune" is the area bounded by two intersecting great circles on the surface of a sphere.) For this explanation of our lune design, reference will be made to FIGS. 12A and 12B.

FIG. 12A shows the geometric construction used to determine the circular arc that forms the lengthwise curvature of each tooth face. First, in the same manner as was explained above in regard to our CT and CD teeth, the design of our lune teeth also begins by initially determining required size and strength specifications in accordance with the application in which the gearing is to be used and, therefrom, selecting an appropriate addendum size, diametral pitch, and normal chordal thickness for the teeth. With this information, a simple construction is made of a radial cross section of the external gear 115, laying out the addendum circle 116, the root circle 118, and the pitch circle 120; and the outlines of a few teeth are also added.

Next, the preselected preferred maximum angle x (in this example: 25°) is laid out from the gear center 122 between radial lines 124, 125; and a chord 126 is drawn between the two respective points 127, 128 at which radial lines 124, 125 intersect pitch circle 120. The length of chord 126 is measured to provide the diameter measurement X which is used for creating the single circle that determines the arc that forms the entire length of the working surface of each lune tooth for the gears.

In a further construction shown in FIG. 13B, external gear 115 and a mating internal gear 130 are laid out in modified flat projections (as explained above) with the axes of the gears intersecting at the preselected preferred maximum angle (e.g., 25°), and the center 132 of a proposed shared mesh is marked. A circle having a diameter of X is drawn about center 132, and the arcs of this circle form the front face of external gear tooth 134 and the rear face of external gear tooth 135. Center 132 is also used to mark the center of an external tooth, and further external tooth centers 137, 138 are marked off along radial center line 136 of gear 115 at successive distances equal to the preselected circular pitch. Thereafter, using circles of the same diameter X and using the successive centers 137, 138, etc., the front and rear faces of the other external gear teeth are constructed.

Similarly, beginning at two points marked off at a distance of one-half the circular pitch on each side of mesh center 132, successive tooth centers 139, 140 are marked off along radial center line 141 of internal gear 130. Then, using circles of the same diameter X and using the successive centers 139, 140, etc., the front and rear faces of the gear teeth of internal gear 130 are constructed. As will be readily understood by persons skilled in the manufacture of gears, such lune gear teeth can be formed by using hollow cylindrical cutters with an inside diameter of X.

With this construction as shown, it can be seen that many lune teeth (e.g., approximately 10 teeth at each shared meshing area) will be in full contact on both of their respective faces when the shaft angle between the gears is at the maximum angle. However, the normal chordal thickness of each lune tooth is not as large as the space between the teeth of its mating gear so that, as the shaft angle decreases from this maximum orientation back toward 180° alignment, the backlash between the meshing lune teeth increases, reaching a fairly substantial maximum amount of backlash when the axles reach 180° alignment. Therefore, our lune-tooth design is not appropriate for applications in which minimum backlash is required at all times, e.g., where expected shaft rotation reversals occur with relative frequency during normal operation.

(e) Combination Lune/Inverse Curve ("L/IC") Design

FIGS. 13A and 13B are schematic representations of the outlines of the meshing teeth of still another pair of gears according to the invention. For reasons that will be apparent from the following explanation, we call this design a lune/inverse-curve combination ("L/IC"). Once again, the outlines of the teeth are shown in modified flat projections of the pair with their axes intersecting at a preferred maximum angle. Of course, it must be remembered that such flat projection merely simulates the real gears whose pitch surfaces are spherical. That is, should the gears illustrated in FIG. 13A be erroneously laid out in the traditional manner on a pitch cylinder, serious interference would occur. However, when laid out on a sphere, these teeth will mesh throughout the full range of angular adjustment without interference or excessive backlash.

As with our other tooth designs just described above, the teeth shown in FIGS. 13A and 13B are most easily explained by means of a construction. For these L/IC teeth, a construction of the design begins with the usual initial determination for selecting an appropriate addendum size, diametral pitch, and normal chordal thickness for the teeth, as well as the desired maximum angle x through which the gear shafts shall be expected to variably intersect to each side of 180°.

Based upon these preselected parameters, flat projections of the pitch circles of the two gears are laid out intersecting at the maximum angle (in the example illustrated in FIG. 13A, at an angle of 45°); and, as with the CT and CD designs, a tooth center 80' for one of the gears is positioned at the point of intersection between the pitch circles. Using the selected circular pitch P', additional tooth centers 81', 82', and 83', 84', 85', and 86', respectively, are marked on each pitch circle. Next, the central portion of each tooth is laid out as a respective circle having a diameter equivalent to the desired chordal thickness D'. Namely, each respective circle is made with a radius T that is equivalent to one-half the chordal thickness (i,e., one-quarter the circular pitch).

The teeth of a first one of the gears are then formed with a lune design, the entire length of each tooth face 87', 88', 89', 90' of each tooth being the arc of a circle having its center located on the pitch circle of the first gear and having a radius R' such that:

$$R' = 3T = \frac{3D'}{2} = \frac{3P'}{4}$$

radius R' being equivalent to one and one-half times the selected chordal thickness, which is also equivalent to three-quarters of the circular pitch.

The teeth of the mating gear of the second gear are formed about tooth centers 80', 81', 82' in a manner quite similar to that described above with regard to our CT and CD teeth. Namely, each circular-arc center portion 91', 92' of each tooth surface is provided with two axially-extending portions 93', 94' contiguous, respectively, with each of its ends; and the surface of each respective extension portion 93', 94' is a line (a) extending from circular central portion 91', 92' at a respective one of two points A', E' and B', F' oppositely disposed from the radial center line 95' of the tooth at respective predetermined tooth surface angles x and (b) extending toward a projected intersection with the axial center line 96' of the tooth. Also, in our L/IC design, like our CT design, the surface of each respective tooth surface extension portion is tangent to the circular central portion of each tooth face.

However, as can be seen in FIG. 13A, each respective tooth surface extension portion 93', 94' is a curved line having a curvature inverse to the curvature of circular central portion 91'. Each of these inversely-curved extension portions is a circular arc with a center of curvature positioned on an extension of its respective tooth surface angle line A', B' and E', F'. Such a construction is shown for the tooth surface extension portions of tooth 97', for which the centers of curvature for extension portions 100', 101', 102', and 103' are, respectively, points 104', 105', 106', and 107'. In this construction, the radius R' of each extension portion is equivalent to three times the radius T of its respective circular central portion.

FIG. 13B illustrates the same mesh of the same pair of L/IC gears shown in FIG. 13A, but with their axes intersecting at only 20° rather than at the preferred maximum angle. It can be seen that five teeth are still in mesh. Therefore, our L/IC design also provides more teeth in mesh at all times than a conventional gear system; and further, when the axes are aligned at 180°, all teeth are in full mesh as in a gear coupling.

VARIABLE-DISPLACEMENT HYDRAULIC MACHINE

A preferred form of the first embodiment of our hydraulic machine invention will be described with reference to FIGS. 14, 15, 16, and 17. As indicated above, our invention relates primarily to the swash-plate assembly and thrust bearing portions of the machine. Since the other elements of the machine are well known in the art, these latter elements will be treated in a relatively cursory manner.

FIG. 14 is a partially schematic cross-sectional view of a hydraulic machine encased in a three-piece modular housing comprising a cylinder unit 150a and an end cap 150b attached by suitable bolts (not shown) to each end of a central housing unit 150c. Formed in housing unit 150a are a plurality of fixed cylinders 152, 153 in which a plurality of "dog-bone" shaped pistons 154, 155 reciprocate. Also formed in housing unit 150a are appropriate passageways 156, 157 for delivering hydraulic fluid to and from cylinders 152, 153. Controlling the flow of fluid to and from cylinders 152, 153 are a plurality of respective 3-land radial valves 158, 159 which are also supported in housing unit 150a and are operated synchronously by a cam 160 fixed for rotation with a drive element 162.

Radial valve 158 is shown connecting passageway 156 with cylinder 152, while closing off the connection between cylinder 152 and passageway 157. Radial valve 159 is shown at the same instant connecting passageway 157 with cylinder 153, while closing off the connection between cylinder 153 and passageway 156. Passageways 156 and 157 are used, respectively, to deliver high and low pressure hydraulic fluid when the machine is being operated as a motor, or low and high pressure, respectively, when the machine is being operated as a pump. The flow of hydraulic fluid to and from cylinders 152, 153 and the operation of radial valves 158, 159 are quite well understood in the art and will not be detailed further.

The stroke of pistons 154, 155 is determined by the angular inclination of a split swash-plate comprising a wobbler 14' and a rotor 16' that nutates as it rotates with drive element 162. Rotor 16' is attached to drive element 162 by a ball bearing support that permits the angular inclination of rotor 16' to be adjusted about pivot point 28'.

Wobbler 14' receives and holds the spherical ends 170, 171 of pistons 154, 155; and while it nutates with rotor 16', it is held against rotation by the nutating gear system of the invention which has already been explained in detail above. Namely, an external gear 10' is fixed to central housing unit 150c, while a mating external gear 20' is fixed to the outer circumferential surface of wobbler 14'. The axis of internal gear 10' is coincident with the rotational axis 42' of drive element 162, and the axis of internal gear 20' passes through pivot point 28'.

Also, in the manner described schematically above with reference to FIG. 1, the axis of external gear 20' is perpendicular to the front face 26' of wobbler 14', and axis 40 intersects rotational axis 42' of drive element 162 at point 28'. Nutating gear pair 10', 20' is provided with mating teeth of our CT, CD, lune, or L/IC designs, external gear 20' nutating about internal gear 10' and restraining the rotation of wobbler 14' in the manner explained in detail above.

The angular inclination of the split swash-plate is adjusted by a servo-control arrangement that, while omitted from FIG. 14, is shown in detail in FIG. 15 which is a relatively schematic illustration of the swash-plate portion of the machine shown in FIG. 14 with many parts shown in FIG. 14 being removed for simplification and clarity. A toggle-link 172 has one end connected to rotor 16' and its other end connected to a control piston 174 that surrounds drive element 162.

A collar 176 is keyed for rotation with drive element 162, and collar 176 includes a cylindrical cavity 177 that surrounds drive element 162 and receives a flange 178 formed at the end of control piston 174. A small servo-mechanism 180, attached to the outside of cylinder housing unit 150a, comprises a servo-piston 182 with two lands 183, 184 and is encased in a servo-cylinder 185. A control rod 186 formed at one end of servo-piston 182 is movable manually or by well-known means (not shown) to adjust the inclination of rotor 16' and, thereby, the angle of wobbler 14' and the stroke of pistons 154, 155 (shown in FIG. 14).

To reduce the inclination of the swash-plate and the stroke of pistons 154, 155, control rod 186 is moved to the right, causing land 183 of piston 182 to uncover a port 183' that is formed within servo-cylinder 185 and connecting input 188 with passageway 189 in housing unit 150a. This permits the flow of pressurized fluid from input 188 through passageway 189 and passageway 190 (in drive element 162) to the left hand portion of cavity 177 formed in collar 176, introducing pressurized fluid to the left hand side of flange 178 of control piston 174.

At the same time, the movement of land 184 of servo-piston 182 opens port 184' within servo-cylinder 185 to connect passageway 192 in housing unit 150a with a fluid drain (not shown), permitting fluid to drain through passageway 192 and 193 (in drive element 162) from the right hand portion of the cavity 177. The resulting pressure differential across flange 178 moves control piston 174 and toggle-link 172 to the right, causing a follower 195 to move to the right with control piston 174. Follower 195 is fixed to the end of servo-cylinder 185, and the latter continues to move to the right until its ports 183', 184' are once again blocked by lands 183, 184 of servo-piston 182.

If control rod 186 of servo-piston 182 is moved to the left, the process just described above reverses: port 184' is opened to fluid input 188 and port 183' is connected to the fluid drain. Thus, pressurized fluid is supplied through passageways 192, 193 to the right hand portion of cavity 177 and flange 178, and fluid in the left hand portion of cavity 177 is allowed to drain. This moves flange 178 of control piston 174 and toggle-link 172 to the left, increasing the inclination of rotor 16' and the stroke of the pistons, until follower 195 moves servo-cylinder 185 and its ports 183', 184' to a position in which they are again blocked by lands 183, 184 of servo-piston 182.

SLIDING SHOE BEARING ASSEMBLIES

As indicated above, our hydraulic machine is remarkably light and compact, and much of its weight and size reduction has been achieved by means of the pressure-balanced sliding shoe bearing assemblies used to support the axial forces exerted on our nutating gear swash-plate mount and drive element by the reciprocating pistons. In this regard, however, it is important to clarify that we have utilized old and well-known "sliding shoe" technology in a significantly different manner than has been done heretofore. Namely, our assemblies are different from prior art arrangements in which sliding shoes slide over a bearing surface as they rotate with pistons in a rotating cylinder block. Our sliding shoes do not move about the machine's rotational axis but rather are held in place to form a bearing surface over which a rotating support member slides. Also, only a relatively light spring preload is used to resiliently bias our sliding shoes against their respective bearing surfaces. That is, we do not have the heavy springs used in prior art designs which exert a relatively large axial force against the sliding shoes and thereby result in lost efficiency due to the addition of significant frictional loads that must be overcome.

Referring again momentarily to the schematic swash-plate assembly in FIG. 1, the axial thrust of pistons 18 acting against wobbler 14 and drive element 24 is supported conventionally with well-known sets of roller bearings 197, 198. Since wobbler 14 is restrained from rotation by nutating gears 10, 20 while rotor 16 rotates with drive element 24, roller bearings 197 permit its rotation relative to wobbler 14. The axial thrust of pistons 18 is transferred through roller bearings 197 to rotor 16, then through rotor 16 to drive element 24, and finally through collar 177' of drive element 24 and roller bearings 198 to a bearing surface on housing 12.

In contrast to this just-described conventional use of roller bearings to support the axial thrust of the machine's pistons, the preferred embodiment of our hydraulic machine illustrated in FIG. 14 uses two sets of pressure-balanced sliding shoes 200, 201 that are independently mounted, respectively, between wobbler 14' and rotor 16' and between collar 176 of drive element 162 and a cylindrical ring 218 that is restrained axially by a support member 202 fixed in central housing unit 150c.

FIGS. 16 and 17 are two enlarged details of the swash-plate assembly portion of the hydraulic machine of FIG. 15. FIG. 16 shows a portion of the invention's pressure-balanced sliding shoe bearing structure that is used between wobbler 14' and rotor 16'. Each one of a plurality of sliding shoes 200 is aligned with the spherical end 170 of a respective piston 154, and each shoe 200 has a hub 204 that is received in a respective pocket 205 formed in the back face 206 of wobbler 14'.

FIG. 17 is a schematic axial view of back face 206 of wobbler 14' showing a plurality of sliding shoes 200 positioned in pockets 205. Each sliding shoe 200 has a bearing surface 208 positioned in sliding contact with a mating surface formed on the front face 210 of rotor 16'. Each sliding shoe 200 also includes a pressure-balancing cavity 211 formed in bearing surface 208; and fluid passageways 212, 213, 214 are formed, respectively, through each piston 154, wobbler 14', and each sliding shoe 200 to connect each pressure-balancing cavity 211 with the head of each respective cylinder 152. In this manner, each respective sliding shoe 200 is supported on rotating front face 210 of rotor 16' by a pressure equal to the pressure present at the head of each respective cylinder 152.

[NOTE: Persons highly skilled in the art will recognize that the circular format in which shoes 200 are organized is different from prior art constructions in which the sliding shoes are arranged in a slightly oval pattern; and it should be noted that, if desired for some applications, pockets 205 may be positioned in such a slightly oval pattern.]

Further, each sliding shoe 200 is resiliently biased by a preload spring 216 toward the front face 210 of rotor 16'.

This is necessary to retain contact between its bearing surface 208 and rotor 16' during the exhaust/fill stroke of its related cylinder.

As just indicated above, rotating collar 176 of drive element 162 bears against a second set of sliding shoes 201 positioned in pockets in the front face of a cylindrical ring 218 that is axially restrained in housing unit 150c by support member 202. The appearance and relationship of sliding shoes 201 and the front face of cylindrical support ring 218 are practically identical to the appearance and relationship of sliding shoes 200 and the back face of wobbler 14' as shown in FIG. 17.

Further, in a manner similar to that just described in regard to sliding shoes 200, the respective bearing surfaces of each sliding shoe 201 are resiliently biased against the mating surface of collar 176 and each bearing surface includes a pressure-balancing cavity formed in its respective bearing surface. Also, fluid passageways 220 formed in housing unit 150c connect each of these respective pressure-balancing cavities with the head of its associated cylinder 152, 153 to provide a support pressure against the rotating surface of collar 176 that is equivalent to the pressure present at the head of the cylinder. The basic format of this same sliding shoe assembly is used in a further embodiment of our hydraulic machine and will be described in greater detail below.

FIXED-DISPLACEMENT HYDRAULIC MACHINE

FIG. 18 schematically illustrates a fixed-angle swash-plate assembly according to the invention. Again, many parts have been omitted for simplification, and it can be assumed that the major elements of the remaining portions of this embodiment are practically identical to those appearing in the embodiment shown in FIG. 14.

An internal gear 10" is fixed to a housing 12", and a mating external gear 20" is fixed to the outer circumferential surface of a wobbler 14" which cooperates with a rotor 16" to form a split swash-plate. Wobbler 14" receives and supports the ends of pistons 18" mounted in respective cylinders (not shown in this drawing), while rotor 16" rotates with a shaft 22" of a drive element 24". The axis 40" of external gear 20" is perpendicular to the front face 26" of wobbler 14" and axis 40" intersects the rotational axis 42" of drive element 24" at point 28", which is also the effective center about which rotor 16" is inclined to axis 42" for rotation and nutation. The axis of internal gear 10" is coincident with rotational axis 42".

In this embodiment, rotor 16" is fixed to drive element 24" at an inclination of some preferred angle x (e.g., 30°), and the mating teeth of gears 10", 20" are formed according to one of the designs detailed above.

In a manner similar to the assemblies described above, rotor 16" includes a hub 224, and wobbler 14" is retained on hub 224 by spanner nut 228 and needle bearings 226, being separated from hub 224 by needle bearings 227. The back face 206" of wobbler 14" has a plurality of pockets 205" into which are fitted the hub portions of respective sliding shoes 200". Each sliding shoe 200" has a bearing surface 208" that is resiliently biased by a spring 216" against the rotating front face 210" of rotor 16". As in the embodiment shown in FIG. 16, a pressure-balancing cavity 211" formed in bearing surface 208" of each sliding shoe 200" is connected by suitable fluid passageways with the cylinder head of the related piston 18".

The back face of fixed-angle rotor 16" serves as a collar 230 for drive element 24", providing a mating surface that slides over a second set of sliding shoes 201". Each shoe 201" has a hub 204" that is received in a respective pocket 205" formed in the front face of a cylindrical ring 218" that is axially restrained in housing 12" by a support member 202". The appearance and relationship of sliding shoes 201" and the front face of cylindrical support ring 218" are practically identical to the appearance and relationship of sliding shoes 200 and the back face of wobbler 14' as shown in FIG. 17.

Further, similar to the other sliding shoes described above, each sliding shoe 201" has a bearing surface 208" that is resiliently biased by a spring 216" against the rotating collar 230" of drive element 24" (i.e., against the back face of rotor 16"). As in the embodiment shown in FIG. 14, a pressure-balancing cavity 211" formed in bearing surface 208" of each sliding shoe 200" is connected by suitable fluid passageways 220" with the cylinder head (see FIG. 14) of each related piston 18" to provide a support pressure against the rotating surface of collar 230 that is equivalent to the pressure present at the head of the cylinder.

Again, it should be noted that sliding shoes 200" and 201" do not move about rotational axis 42" but rather are held against such rotation in their respective pockets 205" in the back face 206" of wobbler 14" and the front face of cylindrical ring 218", respectively, merely providing a pressure-balanced bearing surface for the mating front and rear faces of rotating and nutating rotor 16".

As indicated above, the valve-cylinder-piston elements of this fixed-displacement embodiment are not shown in FIG. 18, but they are identical to the same valve-cylinder-piston elements shown in the cylinder housing unit 150a of the embodiment of our hydraulic machine illustrated in FIG. 14. As can be understood by referring to the elements shown in FIG. 14, as each piston 18" is reciprocated by the alternating pressures of its repetitive pressure/exhaust strokes, each of the sliding shoes 200", 201" with which it is aligned is balanced at all times by exactly the same magnitude of alternating pressure that is present at the head of its respective cylinder.

The non-rotating sliding shoe assemblies just described above make it possible to omit the larger and heavier roller bearing assemblies used in prior art hydraulic machines. When our shoe assemblies are combined with the nutating gears of our new gear system according to the invention disclosed herein, they provide hydraulic machines which can be remarkably reduced in size and weight and which can still efficiently and quietly carry the heavy loads required for high-speed high-pressure automotive and industrial use.

We claim:

1. In a hydraulic machine having:

a housing, a plurality of pistons reciprocatively mounted in cylinders fixed in said housing and positioned circumferentially at a first radial distance about the rotational axis of a drive element, a split swash-plate having an inclination variable up to a predetermined maximum angle relative to said rotational axis, said pistons having a stroke determined by the inclination of said swash-plate; and said swash-plate having:

a wobbler which nutates about said rotational axis but does not rotate and which has
a first face to which said pistons are connected at said first radial distance from said rotational axis, and
an outer circumferential surface, and a rotor that is mounted on a pivot and rotated by said drive element so that, when inclined at an angle to said rotational axis, said rotor nutates when rotating;

the improvement comprising:

an internal gear fixed to said housing and having an axis positioned coincident with said rotational axis;

an external gear fixed to said outer circumferential surface of said wobbler and having an axis aligned perpendicular to said first face of said wobbler;

said internal gear and external gear having pitch circles that are each great circles on a single pitch sphere, said gears having mating teeth in mesh simultaneously at two meshing areas centered 180° apart so that said external gear is nutatable about said internal gear without rotation; and each said mating tooth, when viewed in a pitch plane of its respective gear, having a lengthwise surface with at least a central portion that is an arc of a single circle of predetermined diameter.

2. The hydraulic machine of claim 1 wherein said external gear nutates about said internal gear and prevents the rotation of said wobbler, permitting each point on said outer circumferential surface of said wobbler to trace a lemniscate.

3. The hydraulic machine of claim 1 wherein said mating gears have a diametral pitch selected so that more than two of said mating teeth are in mesh simultaneously at each of said two meshing areas.

4. The hydraulic machine of claim 1 wherein:

said housing comprises a cylinder unit and an end cap, each removably attached to a respective end of a central unit having an axial and a radial dimension;

said pistons have predetermined radial and axial dimensions and are received in cylinders of mating radial dimension formed in said cylinder unit; said drive element has a predetermined axial dimension and is supported by a bearing mounted adjacent to said end cap; and said swash-plate is mounted within said central unit; and said hydraulic machine is modularly alterable, without modifying said end cap and its adjacent bearing, or said swash-plate, or any portion of said cylinder unit except for the axial dimension of said cylinders, and by replacing:

(a) said central housing unit with a similar central unit of identical radial dimension but a modified axial dimension; and (b) said drive element and said pistons with a drive element and pistons each modified relatively in only its respective said axial dimension.

5. The hydraulic machine of claim 1 wherein the inclination of said swash-plate is one of:

(a) fixed at said predetermined maximum angle to said rotational axis, and (b) adjustable between a first position at which the stroke of said pistons is minimum and a second position at which said swash-plate is inclined at said predetermined maximum angle to said rotational axis and the stroke of said pistons is maximum.

6. The hydraulic machine of claim 1 wherein said predetermined maximum angle is 30°.

7. The hydraulic machine of claim 1 wherein each said mating tooth has a chordal thickness of preselected measurement and said single circle has a diameter equivalent to said preselected measurement.

8. The hydraulic machine of claim 7 wherein:

said circular-arc central portion of each said tooth surface has two axially-extending portions contiguous, respectively, with each of its respective ends; and the surface of each respective extension portion, when viewed in said pitch plane, is a line (a) extending from said circular central portion at a respective one of two points oppositely disposed at respective predetermined tooth surface angles measured from a radial center line of said tooth surface and (b) extending toward a projected intersection with the axial center line of the tooth.

9. The hydraulic machine of claim 8 wherein each said respective tooth surface extension portion is a straight line tangent to said circular central portion at its said respective point.

10. The hydraulic machine of claim 8 wherein each said respective tooth surface extension portion is a straight line that is tangent to, and that extends beyond the radial center line of, the circular central portion of the mating tooth with which it is in mesh.

11. The hydraulic machine of claim 8 wherein said respective predetermined tooth surface angles are equal to each other.

12. The hydraulic machine of claim 11 wherein each said tooth surface angle is equal to said predetermined maximum angle.

13. The hydraulic machine of claim 8 wherein each said respective tooth surface extension portion is a curved line tangent to said circular central portion at its said respective point, said curved line having a curvature inverse to the curvature of said circular central portion.

14. The hydraulic machine of claim 13 wherein said inverse curvature is the arc of a circle having a radius equivalent to three times the radius of said circular central portion.

15. The hydraulic machine of claim 1 wherein each of said mating teeth of at least one gear of said pair, when viewed in said pitch plane, has a lune form, the entire lengthwise surface of each tooth being formed by the arc of a circle.

16. The hydraulic machine of claim 15 wherein each of said mating teeth, when viewed in said pitch plane, is an arc of a circle identical in size to a circle formed on the surface of said single sphere, said circle having a diameter that subtends an angle, measured from the center of said sphere, equal to said predetermined maximum angle of rotor inclination.

17. The hydraulic machine of claim 1 wherein the tooth surfaces of each of said mating teeth are substantially straight-sided in profile.

18. The hydraulic machine of claim 17 wherein said straight-sided tooth surfaces are formed by radial line elements of each said gear.

19. The hydraulic machine of claim 17 wherein said straight-sided tooth surfaces are spline-shaped, said mating teeth having sides of equal width from bottom land to top land.

20. The hydraulic machine of claim 17 wherein the upper profiles of said substantially straight-sided tooth surfaces include tip relief.

21. The hydraulic machine of claim 1 wherein the tooth surfaces of each of said mating teeth have an involute shape in profile.

22. The hydraulic machine of claim 1 wherein:

the inclination of said swash-plate is adjustable from a first position at which the stroke of said pistons is minimum to a second position at which said swash-plate is inclined at said predetermined maximum angle and the stroke of said pistons is maximum; and the inclination of said swash-plate is adjusted by a toggle-link that is movable axially relative to said drive element.

23. The hydraulic machine of claim 22 wherein:

one end of said toggle-link is connected to said rotor and the other end of said toggle-link is connected to a control piston.

24. The hydraulic machine of claim 1 wherein:

said wobbler has a second face in close proximity to a mating surface of said rotor; and a first set of sliding shoes are positioned, respectively, in pockets located on said second face of said wobbler in direct alignment with the locations at which said pistons are connected to said first face of said wobbler, a surface of each said sliding shoe being positioned in sliding contact with said mating surface of said rotor.

25. The hydraulic machine of claim 24 wherein:

said rotor has a rear face positioned in close proximity to a bearing surface formed in said housing; and a second set of sliding shoes are positioned, respectively, in pockets located on said bearing surface of said housing, a surface of each said sliding shoe of said second set being positioned in sliding contact with a mating surface formed on said rear face of said rotor.

26. The hydraulic machine of claim 25 wherein:

each said sliding shoe of each said set is resiliently biased toward its said mating surface, and each shoe includes a pressure-balancing cavity formed in its said surface that is in sliding contact with said mating surface; and a respective fluid passageway is formed between the respective head of each said cylinder and the pressure-balancing cavity of a respective sliding shoe of each said set.

27. A split swash-plate assembly for a hydraulic machine, said hydraulic machine having:

a housing, a plurality of pistons reciprocatively mounted in cylinders and positioned circumferentially about the rotational axis of a drive element;

and said swash-plate having:

a wobbler, which nutates but does not rotate about said rotational axis and has an outer circumferential surface, and a rotor that nutates and rotates about said rotational axis, said pistons being connected to a first face of said wobbler, and said rotor being secured to said drive element for rotation therewith at least at one predetermined angle to said rotational axis;

said swash-plate assembly comprising:

an internal gear fixed to said housing and having an axis positioned coincident with said rotational axis;

an external gear fixed to said outer circumferential surface of said wobbler and having an axis aligned perpendicular to said first face of said wobbler;

said internal gear and said external gear having pitch circles that are each great circles on a single pitch sphere, said gears having mating teeth in mesh simultaneously at two meshing areas centered 180° apart so that said external gear is nutatable about said internal gear without rotation; and each said mating tooth, when viewed in a pitch plane of its respective gear, having a lengthwise surface with at least a central portion that is an arc of a single circle of predetermined diameter.

* * * * *

UNITED STATES PATENT AND TRADEMARK OFFICE
CERTIFICATE OF CORRECTION

PATENT NO. : 5,513,553
APPLICATION NO. : 08/274220
DATED : May 7, 1996
INVENTOR(S) : Gleasman et al.

Page 1 of 1

It is certified that error appears in the above-identified patent and that said Letters Patent is hereby corrected as shown below:

On Title Page (item [76]) Inventors, delete "Vernon E. Gleasman, 11 Pondview Dr., Pittsford, N.Y. 14534; Keith E. Gleasman, 11 McCoord Woods, Fairport, N.Y. 14450" and replace with -- Vernon E. Gleasman, 11 Pondview Dr., Pittsford, NY 14534; Keith E. Gleasman, 11 McCoord Woods, Fairport, NY 14450; Arthur H. McElroy, II, 1964 E. 45th Place, Tulsa, OK, 74105; David W. Porter, 9934 S. 106th E. Ave., Tulsa, OK 74133 --

Signed and Sealed this

Fifteenth Day of August, 2006

JON W. DUDAS
*Director of the United States Patent and Trademark Office*